United States Patent [19]
Narimatsu et al.

[11] Patent Number: 6,075,653
[45] Date of Patent: Jun. 13, 2000

[54] PROJECTING ZOOM LENS SYSTEM AND PROJECTOR APPARATUS

[75] Inventors: Shuji Narimatsu; Yoshinobu Asakura, both of Suwa, Japan

[73] Assignee: Nittoh Kogaku K.K., Japan

[21] Appl. No.: 09/086,767

[22] Filed: May 29, 1998

[30] Foreign Application Priority Data

Sep. 16, 1997 [JP] Japan ................................ 9-250643

[51] Int. Cl.[7] .................................................. G02B 15/14
[52] U.S. Cl. ........................................ 359/686; 359/680
[58] Field of Search ................................ 359/686, 680

[56] References Cited

U.S. PATENT DOCUMENTS 5,739,958  4/1998  Abe ........................................ 359/660
5,805,350  9/1998  Yamamoto ........................... 359/686

*Primary Examiner*—Georgia Epps
*Assistant Examiner*—Michael A Lucas
*Attorney, Agent, or Firm*—Thompson Hine & Flory LLP

[57] ABSTRACT

A projecting zoom lens system whose incidence side is telecentric of this invention is formed by the first to fourth lens groups arranged sequentially from the screen side and having negative, positive, negative and positive refractive powers, respectively. The employment of the negative refractive power lens group on the screen side allows a wider angle and a smaller lens aperture of the first lens group, thereby realizing a compact lens with a larger aperture as a whole. Furthermore, if a positive lens is employed on the screen side in the first lens group of the projecting zoom lens, the balance of refractive power can be improved.

10 Claims, 19 Drawing Sheets

PROJECTING ZOOM LENS SYSTEM AND PROJECTOR APPARATUS

BACKGROUND OF INVENTION

1. Technical Field

The present invention relates to a projecting zoom lens system for a projector apparatus that projects and magnifies a light bulb-displayed image onto a screen and, more particularly, to a projecting zoom lens system suitable for a liquid crystal color projector apparatus.

2. Description of the Related Art

FIG. 19 shows one of typical optical system of a liquid crystal projector. A projector 8 capable of magnifying and projecting an image onto a screen or the like normally includes a projecting zoom lens system 1 for projecting an image supplied thereto from the incidence side onto a screen, and an image-forming device 7 for supplying an image to the projecting zoom lens system 1. In the case of liquid crystal projectors, liquid crystal panels are used as light bulbs of the image-forming device 7. The projector 8 shown in FIG. 19 is equipped with a white light source 6, dichroic mirrors 5R and 5G for color separation of light radiated from the light source 6, and three liquid crystal panels 3R, 3G and 3B. These liquid crystal panels are transmission display media and each is act for forming an image of the respective separated color, such as red, green and blue. The images for projection formed by the liquid crystal panels 3B, 3G and 3R are directed to a dichroic prism 2 by reflecting mirrors 4. After the individual color images are combined, the combined image falls on the projecting zoom lens system 1. Thus, the images displayed by the liquid crystal light bulbs 3B, 3G and 3R are combined and magnified, and then imaged on a screen 9.

The projecting zoom lens for a liquid crystal projector needs to have a long back focal distance to allow place the dichroic prism 2. Furthermore, because dichroic prisms have the greatly dependence on angle of incidence due to their spectral characteristics, the optical arrangement of liquid crystal panels must be telecentric system to the dichroic prism. In addition, in the case where crystal light bulbs are used, not limited to the above described projector having three crystal plate for forming an image, due to the relatively small view angles of liquid crystal panels, the image quality highly depends on the angle. Therefore, it is desirable that the incidence side of the projecting lens is telecentric.

Further, there are various demands regarding the performance of the projecting lens. In order to produce brighter and larger images at a shorter projecting distance while using a smaller-size projector apparatus, an increase in the angle at the wide-angle extremity of zoom and a reduction in the diameter ratio of lens system are demanded. To effectively project images formed by the liquid crystal panels having a higher pixel density, a higher performance projecting lens is being desired, in which the resolution is improved; the distortion and the chromatic aberration of magnification are sufficiently corrected; the brightness is increased; and the f-number is reduced.

However, in an optical system where a portion on a side toward the liquid crystal panels, that is, an incidence-side portion, is telecentric, rays from a central portion of a liquid crystal panel are imaged on a screen through a central portion of the lens while rays from a peripheral portion of the liquid crystal panel are imaged on the screen through a peripheral portion of the lens. That is, rays from different portions of the liquid crystal panel are imaged through different portions of a lens surface that have different refractive powers. Therefore, in the projecting lens whose incidence side is telecentric, increases in astigmatism, curvature of field and chromatic aberration of magnification, as well as occurrence of a distortion aberration, which tend to adversely affect the imaging performance to a great extent.

Japanese patent application laid-open No. Hei 7-218837 discloses a projecting zoom lens employing three groups of lenses: first to three lens groups having positive, negative and positive refractive powers, respectively, and arranged sequentially in that order from the screen side. In the projecting zoom lens of this construction, the first lens group, disposed on the screen side, essentially has a larger outside diameter than the other lens groups, resulting that the ratio of diameter of lens system becomes large. Therefore, this projecting zoom lens construction is unsuitable to increase the aperture and/or diameter of the entire projecting zoom lens and, therefore, does not allow a significant reduction in the f-number.

Accordingly, it is an object of the present invention to provide a projecting zoom lens system whose incidence side is telecentric, wherein a wider angle is made possible and a compact construction with a large aperture is achieved by reducing the diameter ratio of the lens system. Another object of the present invention is to provide a projecting zoom lens having a high imaging ability, with correction of aberrations well accomplished. It is still another object of the present invention to provide a projecting zoom lens system wherein aberrations are well corrected at the wide-angle extremity and the telescopic extremity and over the intermediate range therebetween. So that a projecting zoom lens system having an increased resolution, a reduced distortion and a reduced color aberration are achieved. A further object of the present invention is to provide a projector apparatus that is able to produce a large-size and bright image at a short projecting distance while being compact in construction, by using the aforementioned projecting zoom lens system having high imaging ability.

SUMMARY OF THE INVENTION

According to the present invention, a projecting zoom lens system that incidence side is telecentric comprises four lens groups is provided. More specifically, a projecting zoom lens of this invention that incidence side is telecentric comprises, from a screen side, a first lens group having a negative refractive power, a second lens group having a positive refractive power, a third lens group having a negative refractive power and a fourth lens group having a positive refractive power arranged in this order. In the projecting zoom lens system of this invention, zooming is performed by fixing the first and fourth lens groups and moving the second and third lens groups. The arrangement of the lens groups of negative, positive, negative and positive refractive powers sequentially from the screen side in the present invention is a retro-focus type, which tends to have a very long back focal length. Therefore, the arrangement of lens system of this invention is suitable for designing the projecting zoom lens whose incidence side is telecentric. Further, the provision of the lens group of negative refractive power in front on the screen side allows an increased angle of field, so that sufficient wide angle performance can be achieved with a small aperture (small outside diameter) in comparison with a projecting zoom lens construction wherein a lens group having a positive refractive power is instead disposed in front on the screen side. Therefore, it becomes possible to reduce the aperture ratio (diameter ratio) of each lens constituting the projecting zoom lens system and, therefore, to provide a compact projecting zoom lens that allows a wider angle and a low f-number with a large aperture (diameter). By employing this projecting zoom lens system, it is possible to provide a small-size projector apparatus capable of producing a large-size and bright image at a short projecting distance.

In the present invention, if the first lens group employs a combination of a positive refractive power lens component and a negative refractive power lens component arranged in this order from the screen side, for example a combination of a positive lens, a negative meniscus lens and a biconcave lens, it becomes possible to further reduces aberrations. Arrangement of a positive lens on the screen side will make a substantially symmetric distribution of refractive power between the screen side and the incidence side, thereby further reducing astigmatism and other aberrations and making it possible to provide a projecting zoom lens system having higher imaging ability.

Further in the projecting zoom lens of the present invention, it is preferable to divide the third lens group into a forward group on the screen side and a rearward group on the incidence side, and control the distance between the forward and rearward groups during zooming. By controlling the distance between the forward and rearward groups, imaging through appropriate portions of each of the forward and rearward lens groups can be achieved over the zoom range between the wide-angle extremity and the telescopic extremity. Therefore, further reductions of aberrations become possible. If one of the forward group and rearward group has a negative refractive power and the other group has a positive weak refractive power, correction of aberrations is facilitated. If the forward group has a positive refractive power and the rearward group has a negative refractive power, the imaging performance can be further improved by controlling to generally increase the distance between the forward and rearward groups with the zooming from the wide-angle to the telescopic extremity. If the forward group has a negative refractive power and the rearward group has a positive refractive power, the imaging performance can be further improved by controlling to generally decrease the distance between the forward and rearward groups with the zooming from the wide-angle to the telescopic extremity. If the lens component of the rearward group has a convex surface to the incidence side, aberrations can be further corrected by forming that convex surface as an aspherical surface.

Since the projecting zoom lens system for the projector apparatus of the present invention has a telecentric design on its incidence side, rays for forming images pass through different portions of the lens or lens surface. Therefore, it is desirable that, on the incidence side, to correct aberrations separately for a central lens portion through which on-axis rays pass and a peripheral lens portion through which off-axis rays pass. To this end, it is preferred that at least one of the third and fourth lens groups has at least one aspherical surface lens. In particular, since the third lens group tends to have a relatively small aperture, at least one lens on the incidence side in the third lens group is aspherical, so that correction of aberrations using the aspherical surface can be accomplished at low costs.

Furthermore, in the projecting zoom lens system of the present invention, it is preferred that the resultant focal length of the first and second lens groups at the wide-angle extremity $fw_{12}$, and the resultant focal length of the third and fourth lens groups at the wide-angle extremity $fw_{34}$ satisfy the following condition:

$$0.3 < (fw_{12}/fw_{34}) < 1.5 \quad (A)$$

If the ratio of the resultant focal length $fw_{12}$ and $fw_{34}$ is less than the lower limit, the coma aberration inconveniently increases so that the correction becomes difficult. Furthermore, the chromatic aberration of magnification in an intermediate range between the wide angle and the telescopic extremity inconveniently increases so that pixel color drift/shift becomes inconveniently large. On the other hand, if the ratio of the resultant focal length $fw_{12}$ and $fw_{34}$ is greater than the upper limit, the curvature of field inconveniently increases so that the performance at the telescopic extremity deteriorates.

DESCRIPTION OF THE PREFERRED EMBODIMENT

[Embodiment 1]

Figure 1:
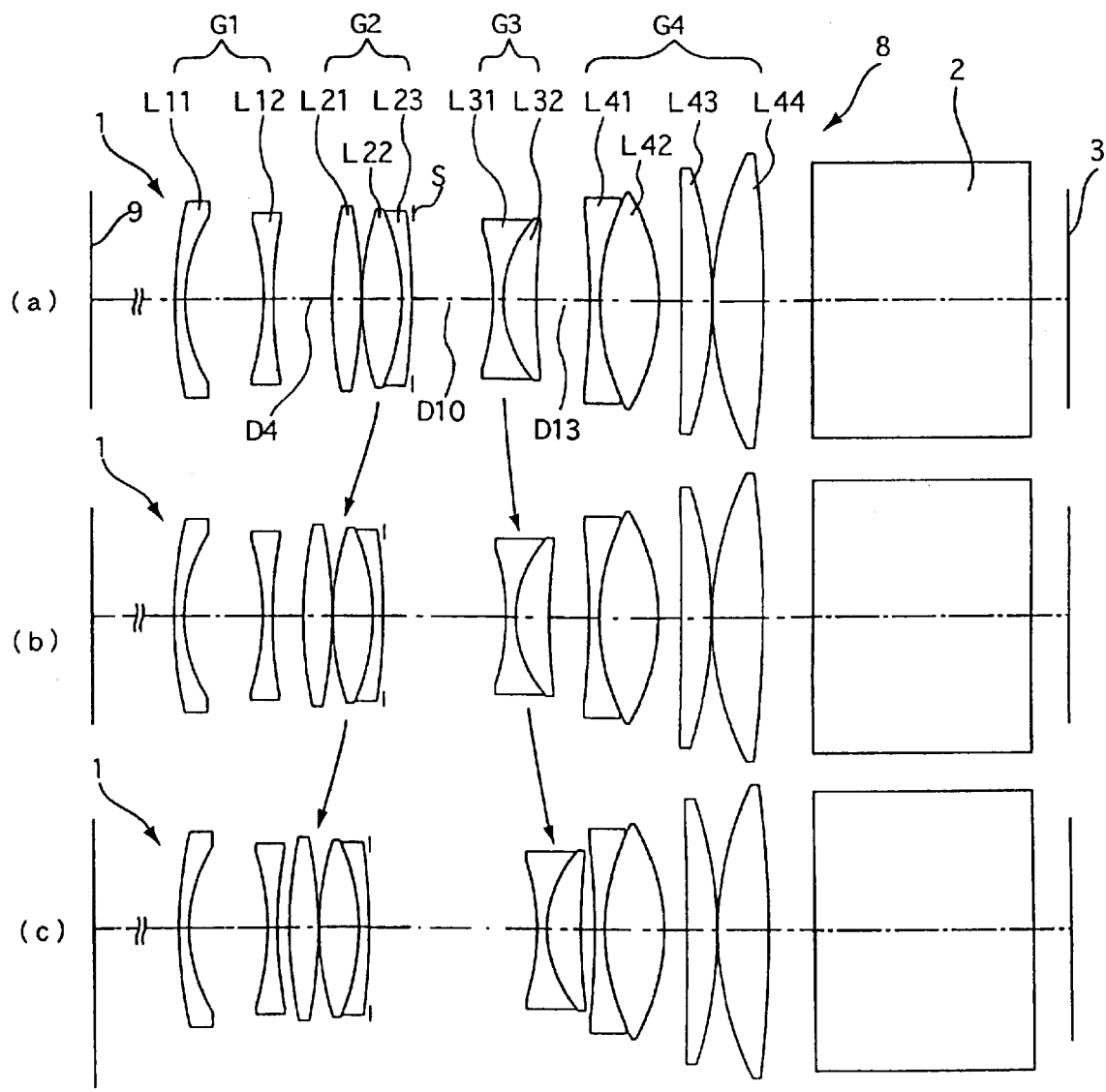
FIG. 1 shows an optical system employing lens system according to Embodiment 1 of the present invention, illustrating lens system arrangements at each condition of the wide-angle extremity (a), the telescopic extremity (c) and an intermediate position (b).
Figure 19:
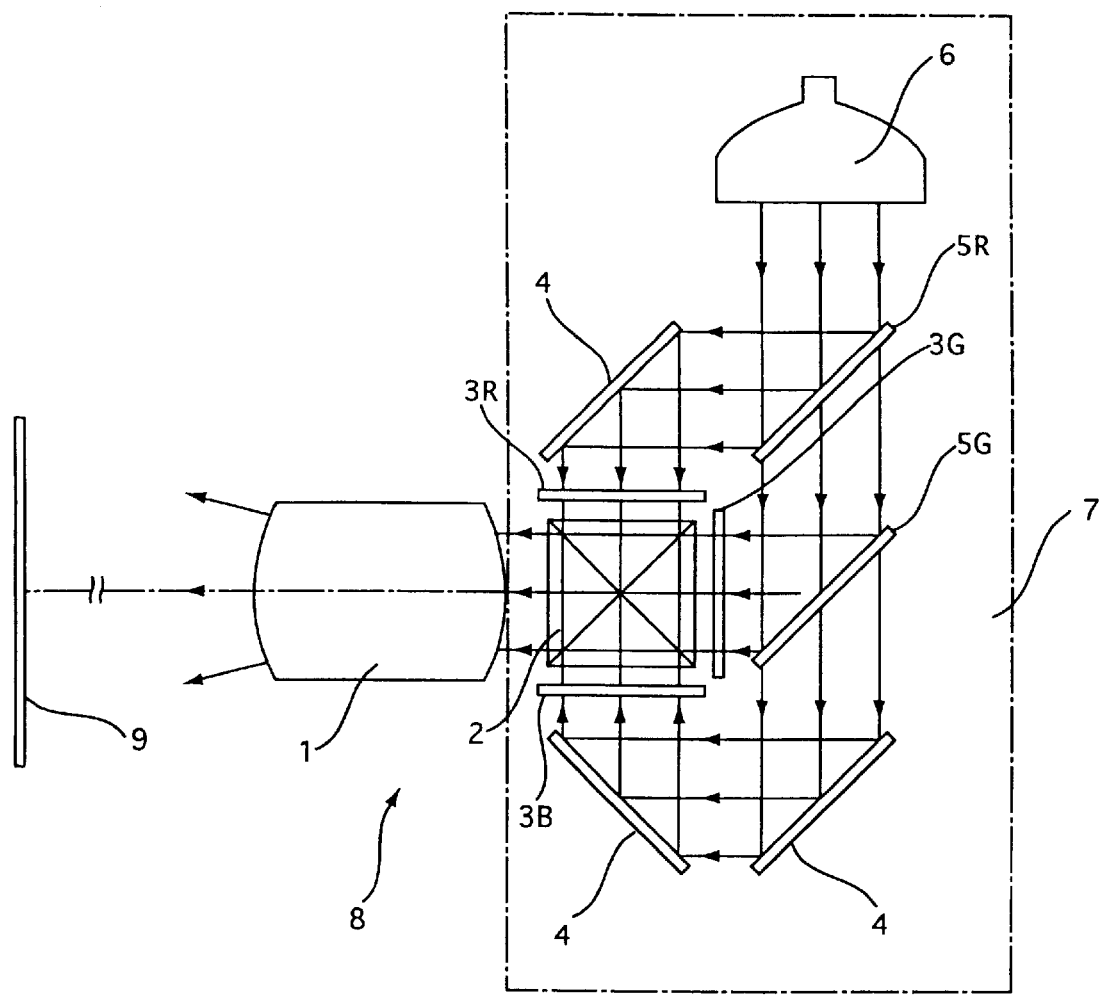
FIG. 19 shows an example construction of a liquid crystal projector.

FIG. 1 shows an optical system of a projector employing a projecting zoom lens system 1 according to an embodiment 1 of the present invention. In the optical system of the projector 8 shown in this figure, light from a light source, which is not shown in the figure, passes through a liquid crystal panel 3 and a dichroic prism 2 and is incident on the projecting zoom lens system 1, so that the image formed by the liquid crystal panel 3 is projected onto a screen 9. As described above in conjunction with FIG. 19, it is possible to form images of three primary colors resulting from color separation in respective liquid crystal panels 3 and combine the images using the dichroic prism 2. It is also possible to use a liquid crystal panel capable of color display to supply a color image to the projecting zoom lens 1, whereby a magnified image is projected.

FIG. 1 illustrates the lens positioning patterns of the projecting zoom lens system according to this embodiment at the wide-angle extremity (a) for magnified display, the telescopic extremity (c) that is a normal position, and an intermediate zoom point (b). The projecting zoom lens system 1 of this embodiment is made up of 11 lenses L11–L44 divided into first to fourth groups G1–G4 arranged sequentially from a side facing the screen 9. Detail data regarding each lens are indicated below. The first lens group G1, disposed closest to the screen 9, is a lens group having a negative refractive power and made up of a screen side-convex negative meniscus lens L1 and a biconcave negative lens L12 that are arranged in that order from the screen side. The first lens group G1 remains fixed in position during zoom.

The second lens group G2 for zoom is a lens group having a positive refractive power and made up of an arrangement of, form the screen side, a biconvex positive lens L21, and a biconvex positive lens L22 and a screen side-concave negative meniscus lens L23 that together form a doublet. The second lens group G2 for zoom is designed to be moved along the optical axis from the incidence side toward the screen side with zooming from the wide-angle extremity toward the telescopic extremity so that an image of predetermined magnification can be projected on the screen.

The third lens group G3, disposed next to the second lens group G2, is a lens group for correction that is moved along the optical axis during zoom. The third lens group G3 is a negative refractive power lens group. In the projecting zoom lens system of this embodiment, the third lens group G3 is made up of a combination of a biconcave negative lens L31 and a screen side-convex positive lens L32.

The fourth lens group G4, disposed closest to the incidence side end of the projecting zoom lens 1 of this embodiment, is a lens group having a positive refractive power as a whole. The fourth lens group G4 is made up of an arrangement of, from the screen side, a biconcave negative lens L41 and a biconvex positive lens L42 that form a doublet, and an incidence side-convex positive meniscus lens L43, and a biconvex positive lens L44.

The projecting zoom lens system 1 of this embodiment is formed by these four lens groups that are negative, positive, negative and positive in refractive power and thus makes a retro-focus type combination. Therefore, a long back focal length can be provided and thereby forming a projecting zoom lens whose incidence side is telecentric. Hence, the projecting zoom lens system 1 is suitable for the projector 8 employing the dichroic prism and/or liquid crystal panels as a light bulb arrangement. Further, since the projecting zoom lens 1 of this embodiment is provided with the lens group G1 of negative refractive power in front on the screen side, an increased angle of field can be achieved. Therefore, sufficient wide-angle performance can be achieved even if the first lens group, particularly, the screen-side lens of the first lens group, has a small outside diameter. Thus the aperture ratio (diameter ratio) of this lens group or lens included in this lens group relative to the other lens groups does not become significantly large. In a projecting lens construction wherein the lens group disposed on the screen side has a positive refractive power, the outside diameter of the screen-side lens group is essentially large, so that it is difficult to increase the aperture of the incidence-side lens group or an intermediate lens group. In contrast, in the projecting zoom lens 1 of this embodiment, the aperture ratio of the first lens group to the other lens group does not become large, so that it is possible to enlarge the diameter of the other lens group without enlarging the diameter of the first lens group and the total diameter of the lens system 1. Therefore, it is possible to provide a compact projecting zoom lens having a large aperture of the entire zoom lens. Also, it becomes possible to realize a compact projecting zoom lens having a sufficient wide-angle ability and, further, an improved brightness and a reduced f-number. By using the projecting zoom lens 1 of this embodiment, it is possible to provide the small-size projector 8 capable of producing a bright and large-size image at a short projecting distance.

Furthermore, the projecting zoom lens system 1 of this embodiment is intended to provide good correction of aberrations by designing it so that the resultant focal length of the first and second lens groups at the wide-angle extremity $fw_{12}$ and the resultant focal length of the third and fourth lens groups at the wide-angle extremity $fw_{34}$ satisfy the following condition:

$$0.3 < (fw_{12}/fw_{34}) < 1.5 \qquad (1)$$

In the following lens data, "ri" is the radius of curvature of each lens surface arranged sequentially from the screen side; "di" is the distance between the lens surfaces arranged sequentially from the screen side; "ni" is the refractive rate (d line) of each lens arranged sequentially from the screen side; and "vi" is the Abbe number (d line) of each lens arranged sequentially from the screen side. In the projecting zoom lens system 1 of this embodiment, a stop S is provided on the incidence side of the second lens group G2, and the distances between the stop S and the lens surfaces on its both sides are also presented below. It should be noted that the lens data for the other embodiments provided below are similarly indicated. INF in the data lists indicates the surfaces of the prism and the stop.

Lens Data

| i | ri | di | ni | vi | note |
|---|---|---|---|---|---|
| 1 | 88.26500 | 2.000 | 1.51680 | 64.20 | lens L11 |
| 2 | 31.76700 | 15.600 | | | |
| 3 | −52.06300 | 2.000 | 1.48749 | 70.44 | lens L12 |
| 4 | 90.29500 | D4 | | | |
| 5 | 92.38000 | 5.700 | 1.77250 | 49.62 | lens L21 |
| 6 | −91.40800 | 0.200 | | | |
| 7 | 58.92200 | 7.900 | 1.77250 | 49.62 | lens L22 |
| 8 | −44.42600 | 2.000 | 1.84666 | 23.78 | lens L23 |
| 9 | −131.24800 | 0.200 | | | |
| 10 | INF | D10 | | | stop S |
| 11 | −46.80700 | 2.000 | 1.79950 | 42.34 | lens L31 |
| 12 | 24.00400 | 6.700 | 1.80518 | 25.46 | lens L32 |
| 13 | 134.28200 | D13 | | | |
| 14 | −165.57000 | 2.000 | 1.84666 | 23.78 | lens L41 |
| 15 | 46.19000 | 11.600 | 1.48749 | 70.44 | lens L42 |
| 16 | −43.89600 | 4.500 | | | |
| 17 | −1183.46600 | 6.000 | 1.62299 | 58.12 | lens L43 |
| 18 | −85.67000 | 0.200 | | | |
| 19 | 66.40900 | 10.100 | 1.62299 | 58.12 | lens L44 |
| 20 | −234.45000 | | | | |
| 21 | INF | 44.000 | 1.51680 | 64.20 | prism |
| 22 | INF | | | | |

| Condition | f | D4 | D10 | D13 | F-No. |
|---|---|---|---|---|---|
| W | 48.1 | 11.776 | 15.949 | 10.621 | 2.3 |
| I | 60.0 | 6.186 | 24.245 | 7.916 | 2.6 |
| T | 72.0 | 2.400 | 33.206 | 2.741 | 2.9 |

Where W is wide-angle extremity, I is intermediate position, and T is telescopic extremity. "f" is a resultant focal length of the lens system. These are the same in the other embodiment.

$$fw_{12}/fw_{34}=0.5$$

The distance indicated D4 are values when imaging is achieved at a position of 2.4 m from the forward end of the lens system 1 in this embodiment and the other embodiments described below.

Figure 2:
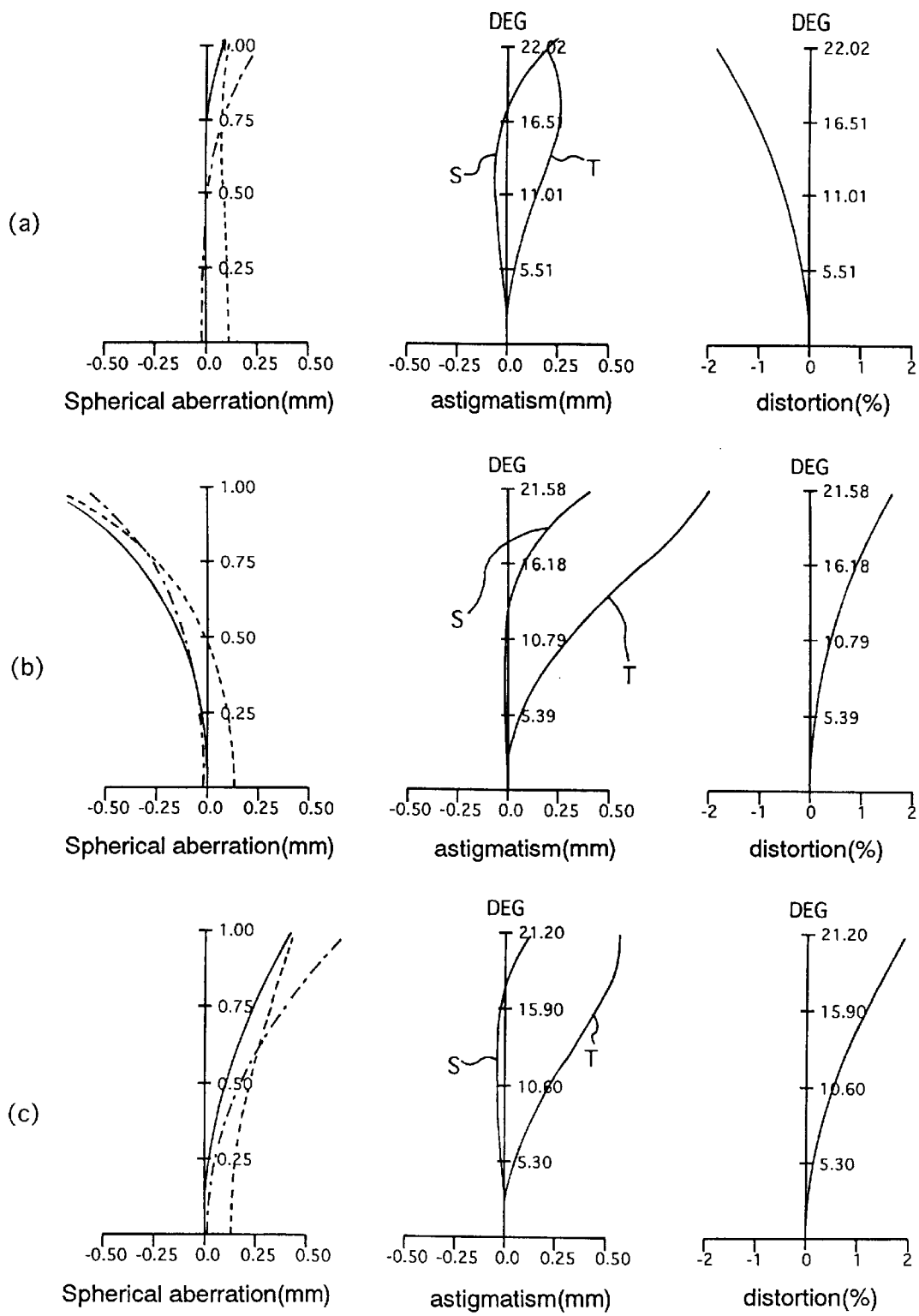
FIG. 2 indicates various aberration curves at each condition of the wide-angle extremity (a), an intermediate zoom point (b) and the telescopic extremity (c) of the lens of Embodiment 1.

FIG. 2 indicates the spherical aberration, the astigmatism and the distortion aberrations at the wide-angle extremity (a), an intermediate zoom point (b) and the telescopic extremity (c) of the projecting zoom lens of this embodiment. The diagrams of spherical aberration indicate aberrations at wavelengths of 620.0 nm (dotted line), 540.0 nm (solid line) and 460.0 nm (dot-dash line), and the diagrams of astigmatism indicate tangential rays (T) and sagittal rays (S), in this embodiment and, also, the other embodiments described below.

The projecting zoom lens of this embodiment is a bright lens having an f-number of 2.3–2.9 and a short focal length range of 48.1–72.0. Although the ratio $fw_{12}/fw_{34}$ is relatively toward the lower limit, the chromatic aberration values are sufficiently small, and the coma aberration is corrected and, therefore, the astigmatism is sufficiently small. Therefore, it should be clear that a high-resolution projecting zoom lens system with reduced pixel color drift has been provided. Other various aberrations are sufficiently small at the wide-angle extremity, the intermediate zoom point and the telescopic extremity so that no practical problems will occur. Thus, the projecting zoom lens of this embodiment has good imaging ability.

[Embodiment 2]

Figure 3:
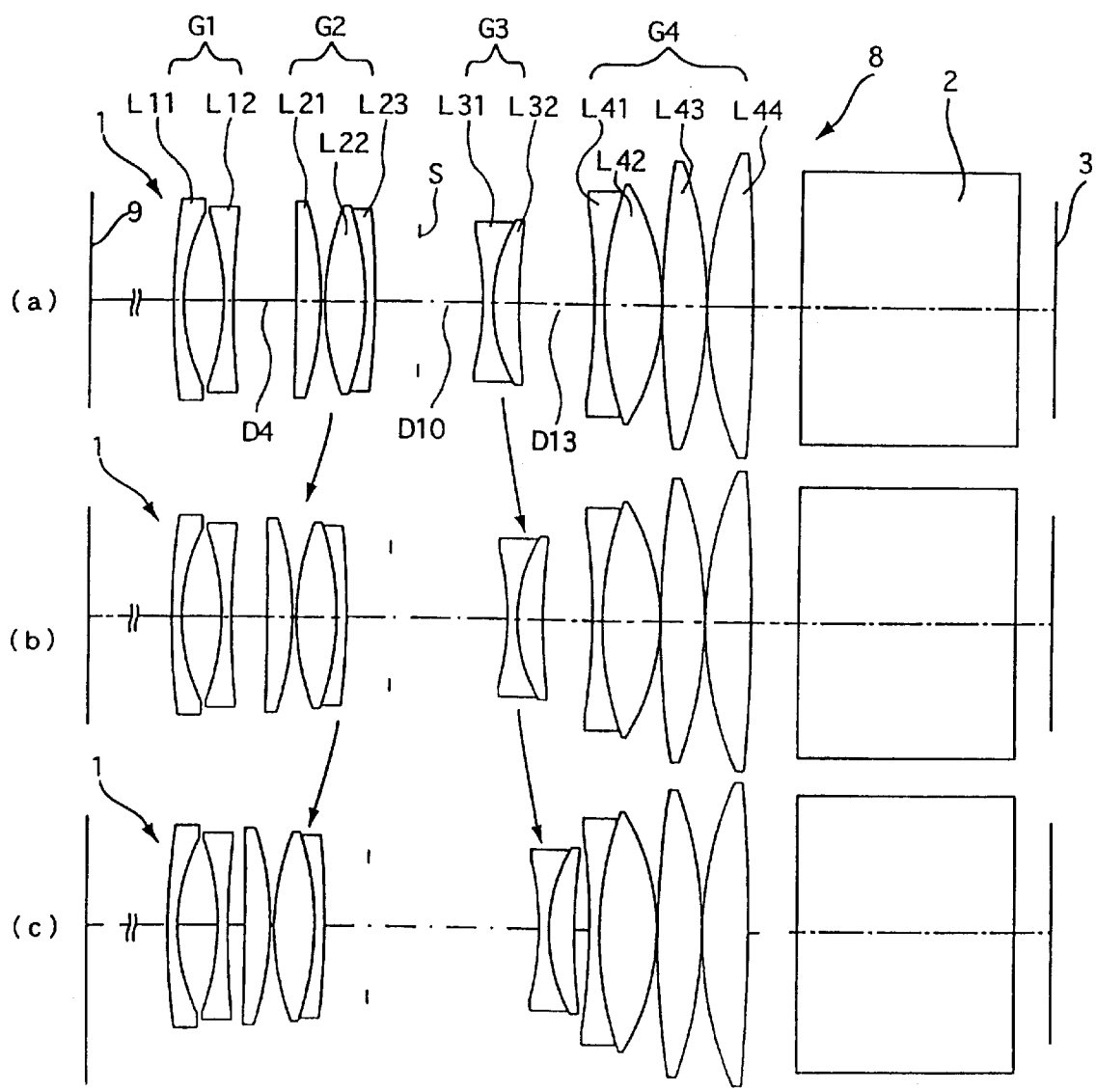
FIG. 3 shows an optical system employing lens system according to Embodiment 2 of the present invention, illustrating lens system arrangements at each condition as same as FIG. 1.

FIG. 3 shows an optical system of a projector employing a projecting zoom lens 1 according to an embodiment 2 of the present invention. In conjunction with this embodiment and the embodiments described below, portions comparable to those in the embodiment described above are represented by comparable reference numerals, and will not be described again. The projecting zoom lens system 1 of this embodiment is also made up of 11 lenses L11–L44 divided into first to fourth groups G1–G4 arranged sequentially from a side facing a screen 9. Detail data regarding each lens are indicated below. The first to fourth lens groups of this embodiment sequentially arranged from the screen side have negative, positive, negative and positive refractive powers, respectively, and achieve substantially the same abilities as in the foregoing embodiment. The major construction of each lens of the projecting zoom lens 1 of this embodiment is substantially the same as that in the foregoing embodiment except the lens L21 and L43. The lens L21 on the screen side in the second lens group of this embodiment is a screen side-concave positive lens and the second lens L43 from the incidence side in the fourth lens group of this embodiment is a biconvex positive lens.

Lens Data

| i | ri | di | ni | vi | note |
|---|---|---|---|---|---|
| 1 | 152.86600 | 2.000 | 1.51680 | 64.20 | lens L11 |
| 2 | 40.19100 | 8.200 | | | |
| 3 | −49.69300 | 2.000 | 1.48749 | 70.44 | lens L12 |
| 4 | 179.59300 | D4 | | | |
| 5 | −730.64800 | 5.000 | 1.77250 | 49.62 | lens L21 |
| 6 | −65.07300 | 0.900 | | | |
| 7 | 54.34800 | 8.100 | 1.77250 | 49.62 | lens L22 |
| 8 | −58.41700 | 2.000 | 1.84666 | 23.78 | lens L23 |
| 9 | −172.56900 | 8.700 | | | |
| 10 | INF | D10 | | | stop S |
| 11 | −56.36200 | 2.000 | 1.79950 | 42.34 | lens L31 |
| 12 | 33.41900 | 5.200 | 1.80518 | 25.46 | lens L32 |
| 13 | 134.71400 | D13 | | | |
| 14 | −133.98700 | 2.000 | 1.84666 | 23.78 | lens L41 |
| 15 | 73.41200 | 11.600 | 1.48749 | 70.44 | lens L42 |
| 16 | −46.53400 | 0.200 | | | |
| 17 | 192.78600 | 8.800 | 1.62299 | 58.12 | lens L43 |
| 18 | −86.04800 | 0.200 | | | |
| 19 | 77.22700 | 9.300 | 1.62299 | 58.12 | lens L44 |
| 20 | −363.87300 | | | | |
| 21 | INF | 44.000 | 1.51680 | 64.20 | prism |
| 22 | INF | | | | |

| Condition | f | D4 | D10 | D13 | F-No. |
|---|---|---|---|---|---|
| W | 48.1 | 12.554 | 13.021 | 15.345 | 2.3 |
| I | 60.0 | 7.167 | 23.655 | 10.100 | 2.6 |
| T | 72.0 | 3.469 | 34.393 | 3.059 | 2.9 |

$$fw_{12}/fw_{34}=0.9$$

Figure 4:
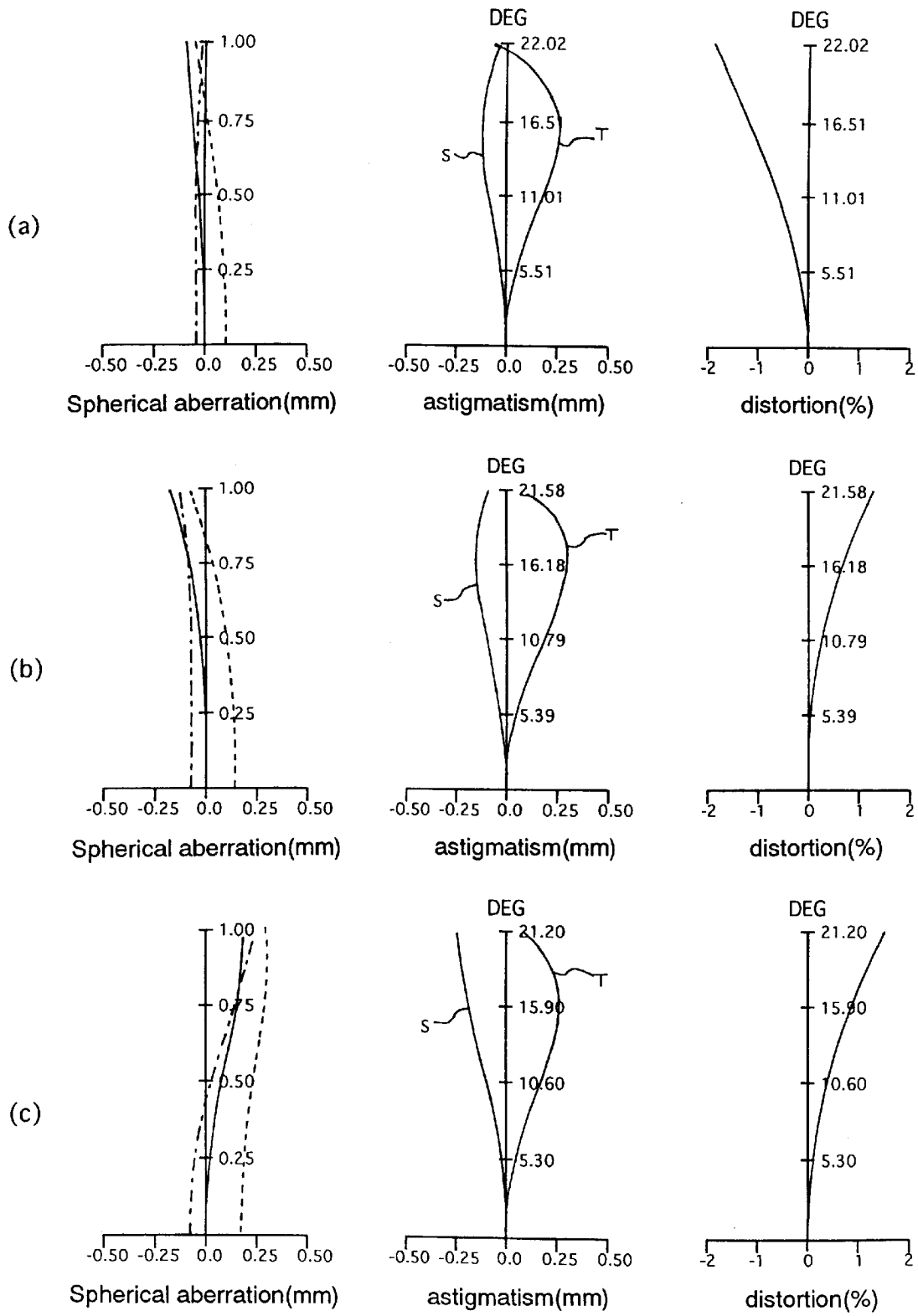
FIG. 4 indicates various aberration curves of the lens system of Embodiment 2 at each condition as same as FIG. 2.

FIG. 4 indicates the spherical aberration, the astigmatism and the distortion at the wide-angle extremity (a), an intermediate zoom point (b) and the telescopic extremity (c) of the projecting zoom lens of this embodiment.

The projecting zoom lens system 1 of this embodiment is also a bright lens having an f-number of 2.3–2.9 and a short focal length range of 48.1–72.0. Further, the ratio $fw_{12}/fw_{34}$ is an intermediate value, and the values of the various aberrations at the wide-angle extremity, and the intermediate zoom point and the telescopic extremity are sufficiently small that indicating good characteristics.

[Embodiment 3]

Figure 5:
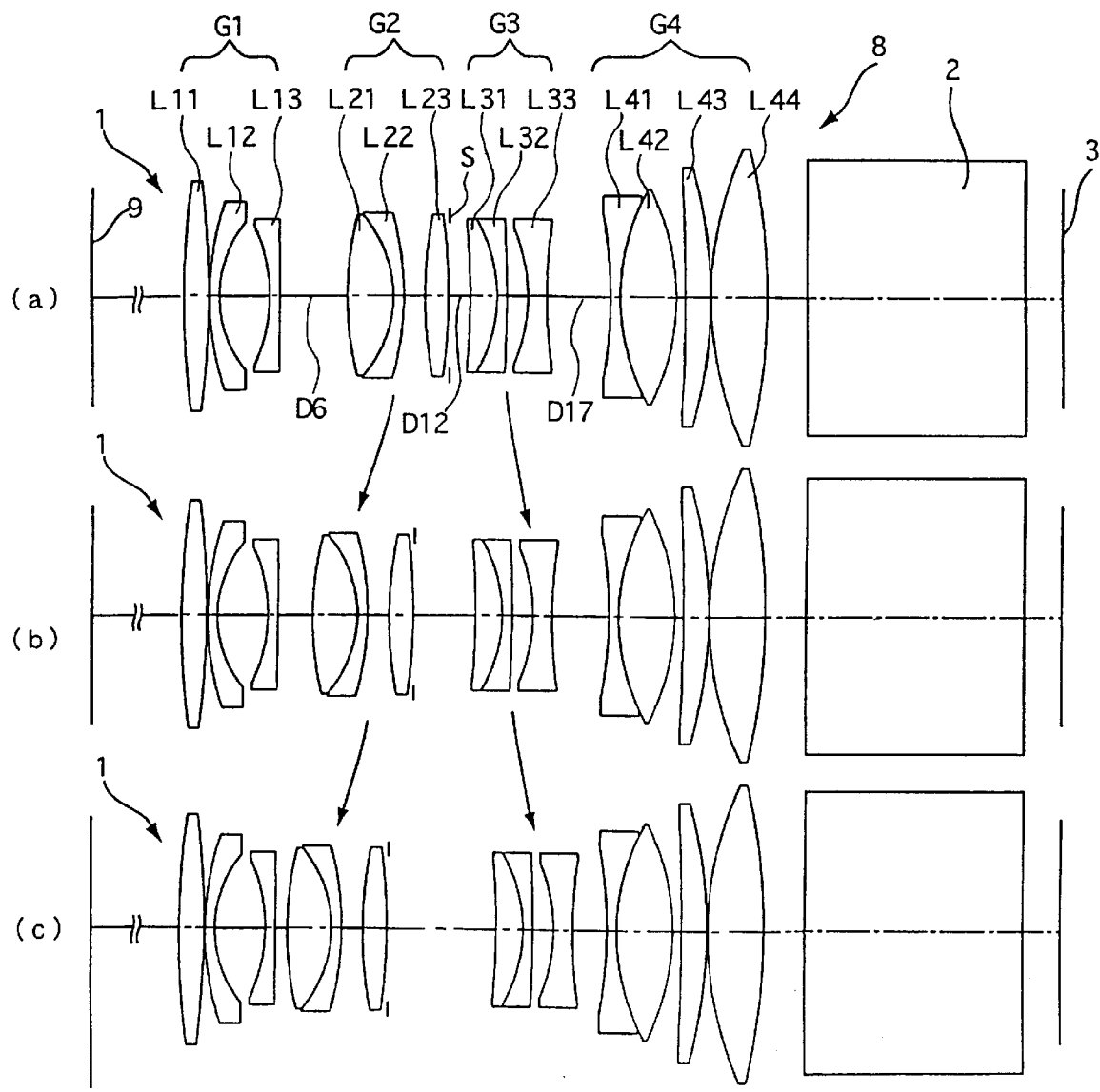
FIG. 5 shows an optical system employing lens system according to Embodiment 3 of the present invention, illustrating lens system arrangements at each condition as same as FIG. 1.

FIG. 5 shows an optical system of a projector employing a projecting zoom lens system 1 according to an embodiment 3 of the present invention. The projecting zoom lens 1 of this embodiment is also made up of first to fourth groups G1–G4 arranged sequentially from a side facing a screen 9, and having negative, positive, negative and positive refractive powers, respectively. Therefore, the projecting zoom lens system 1 of this embodiment achieves substantially the same abilities as the foregoing embodiments.

In the zoom lens system 1 of this embodiment, the first lens group G1 has a three lens combination wherein a biconvex positive lens L11 is additionally disposed on the screen side. From the lens L11, a screen side-convex negative meniscus lens L12 and a biconcave negative lens L13 that are similar to those in the foregoing embodiments are sequentially arranged. The employment of a combination of positive and negative lenses for the first lens group G1 facilitates correction of spherical and the other aberrations. Furthermore, the provision of the positive lens on the screen side makes an approximately symmetrical lens arrangement wherein positive lenses are disposed on the screen side and the incidence side, so that astigmatism and the other aberrations can be reduced. Therefore, it becomes possible to provide a projecting zoom lens having a further improved imaging ability.

Furthermore, in the projecting zoom lens system 1 of this embodiment, a biconcave negative lens L33 for correction is additionally provided in the third lens group, whereby light rays pass through portions of appropriate refractive powers in the plurality of lenses while that are being moved during zoom. Therefore, in this projecting zoom lens 1, the aberrations and color drift are reduced. In the second lens group for zoom, the lens L21 and the lens L22 form a doublet.
Lens Data

| i | ri | di | ni | vi | note |
|---|---|---|---|---|---|
| 1 | 178.12100 | 5.100 | 1.75520 | 27.53 | lens L11 |
| 2 | −169.08900 | 0.200 | | | |
| 3 | 58.20100 | 2.000 | 1.48749 | 70.44 | lens L12 |
| 4 | 22.81000 | 10.200 | | | |
| 5 | −32.82800 | 2.000 | 1.65844 | 50.85 | lens L13 |
| 6 | −1675.65500 | D6 | | | |
| 7 | 68.12500 | 8.900 | 1.71700 | 47.98 | lens L21 |
| 8 | −24.53800 | 2.000 | 1.84666 | 23.78 | lens L22 |
| 9 | −61.16500 | 4.100 | | | |
| 10 | 88.80400 | 4.600 | 1.78590 | 43.93 | lens L23 |
| 11 | −122.90100 | 0.200 | | | |
| 18 | −89.87900 | 2.000 | 1.84666 | 23.78 | lens L41 |
| 19 | 43.77500 | 11.200 | 1.48749 | 70.44 | lens L42 |
| 20 | −46.56000 | 1.800 | | | |
| 21 | −401.24800 | 5.000 | 1.62041 | 60.34 | lens L43 |
| 22 | −93.72400 | 0.200 | | | |
| 23 | 72.32600 | 11.200 | 1.72342 | 37.99 | lens L44 |
| 24 | −125.77800 | | | | |
| 25 | INF | 44.000 | 1.51680 | 64.20 | prism |
| 26 | INF | | | | |

| Condition | f | D6 | D12 | D17 | F-No. |
|---|---|---|---|---|---|
| W | 48.1 | 13.617 | 4.168 | 13.012 | 2.3 |
| I | 60.0 | 7.050 | 12.169 | 11.577 | 2.6 |
| T | 72.0 | 2.400 | 21.405 | 6.992 | 2.9 |

$fw_{12}/fw_{34}=0.5$

Figure 6:
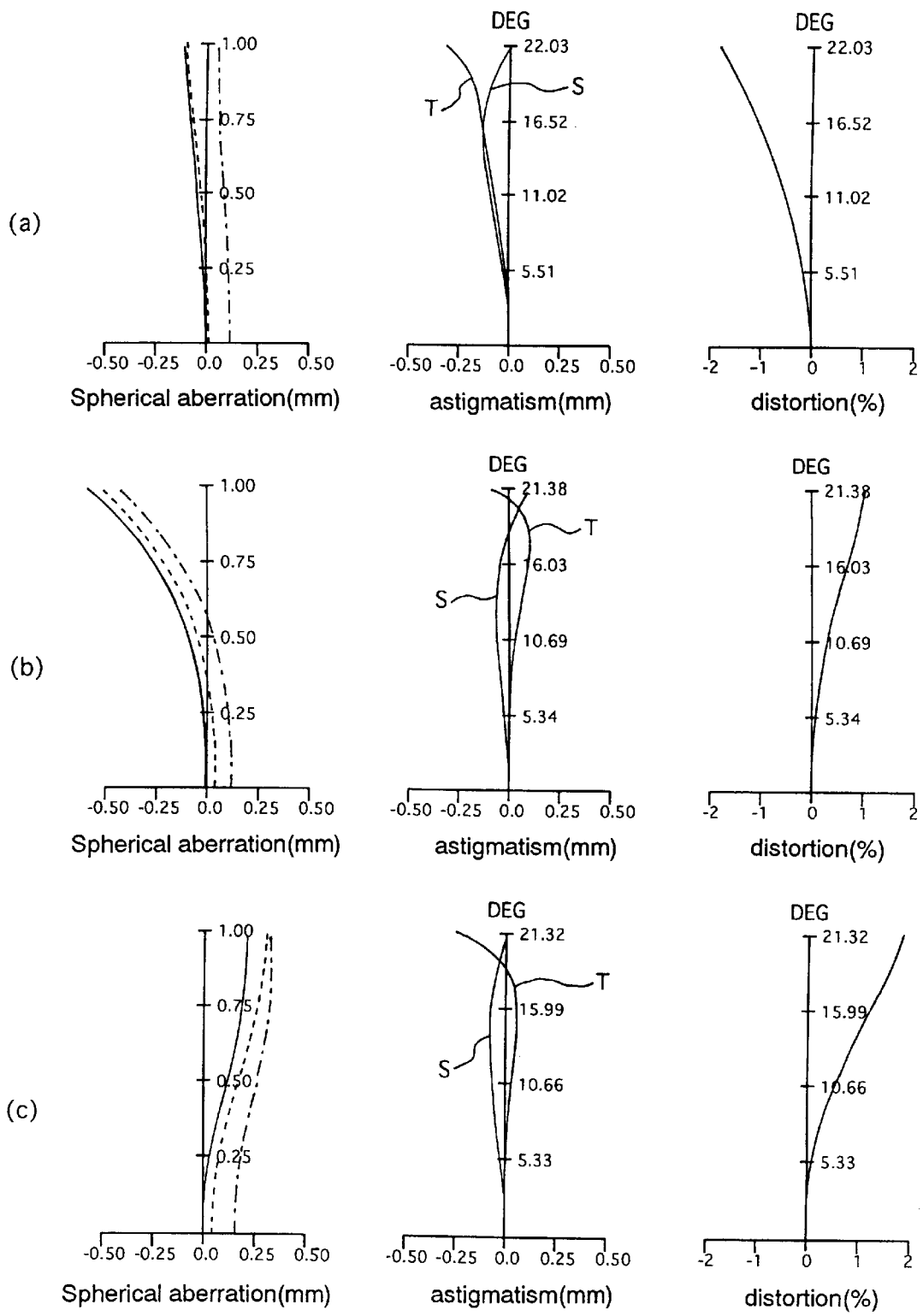
FIG. 6 indicates various aberration curves of the lens system of Embodiment 3 at each condition as same as FIG. 2.

FIG. 6 indicates the spherical aberration, the astigmatism and the distortion at the wide-angle extremity (a), an intermediate zoom point (b) and the telescopic extremity (c) of the projecting zoom lens of this embodiment. The projecting zoom lens of this embodiment is also a bright lens having an f-number of 2.3–2.9 and a short focal length range of 48.1–72.0. Further, although the ratio $fw_{12}/fw_{34}$ is relatively toward the lower limit, the chromatic aberration is sufficiently small. Thus, this embodiment makes a projecting lens with reduced color drift. The values of the various other aberrations at the wide angle, and the intermediate zoom point and the telescopic extremity indicate sufficiently good characteristics and, in particular, the astigmatism has good values.

[Embodiment 4]

Figure 7:
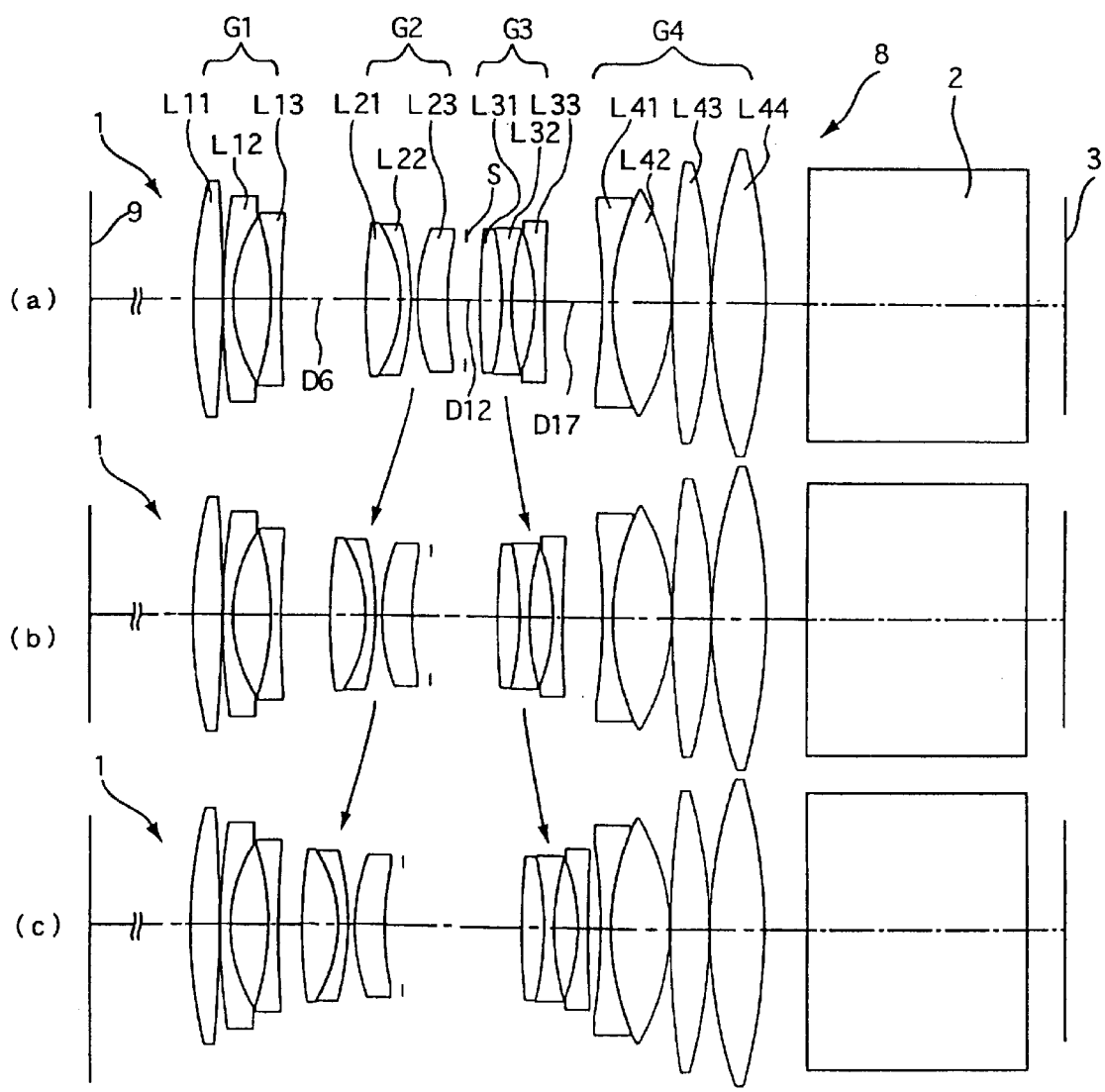
FIG. 7 shows an optical system employing lens system according to Embodiment 4 of the present invention, illustrating lens system arrangements at each condition as same as FIG. 1.

FIG. 7 shows an optical system of a projector employing a projecting zoom lens 1 according to an embodiment 4 of the present invention. The projecting zoom lens system 1 of this embodiment is also made up of first to fourth groups G1–G4 arranged sequentially from the screen side and having negative, positive, negative and positive refractive powers, respectively. Therefore, the projecting zoom lens 1 of this embodiment also achieves substantially the same abilities as the foregoing embodiments. In the projecting zoom lens system 1 of this embodiment, the lens on the screen side in the first lens group G1 is a biconvex positive lens L11 as in the embodiment 3, thereby making an approximately symmetrical lens arrangement, which facilitates reduction of astigmatism and the other aberrations. In the second lens group for zoom in the projecting zoom lens 1 of this embodiment, the incidence-side lens L23 is a screen side-convex negative meniscus lens.
Lens Data

| i | ri | di | ni | vi | note |
|---|---|---|---|---|---|
| 1 | 101.92500 | 5.800 | 1.75520 | 27.53 | lens L11 |
| 2 | −287.91500 | 0.200 | | | |
| 3 | 146.85200 | 2.000 | 1.48749 | 70.44 | lens L12 |
| 4 | 31.44800 | 7.600 | | | |
| 5 | −54.88900 | 2.000 | 1.65844 | 50.85 | lens L13 |
| 6 | 242.85400 | D6 | | | |
| 7 | 110.20300 | 7.100 | 1.71700 | 47.98 | lens L21 |
| 8 | −28.73700 | 2.000 | 1.84666 | 23.78 | lens L22 |
| 9 | −57.60800 | 1.300 | | | |
| 10 | 41.77600 | 6.000 | 1.78590 | 43.93 | lens L23 |
| 11 | 64.07000 | 3.700 | | | |
| 12 | INF | D12 | | | stop S |
| 13 | 156.59100 | 4.500 | 1.84666 | 23.78 | lens L31 |
| 14 | −62.13800 | 2.000 | 1.60342 | 38.01 | lens L32 |
| 15 | 53.07600 | 4.800 | | | |
| 16 | −39.40900 | 2.000 | 1.58144 | 40.89 | lens L33 |
| 17 | 379.80300 | D17 | | | |
| 18 | −118.04600 | 2.000 | 1.84666 | 23.78 | lens L41 |
| 19 | 53.22000 | 11.600 | 1.48749 | 70.44 | lens L42 |
| 20 | −45.32600 | 0.200 | | | |
| 21 | 198.75400 | 7.600 | 1.62041 | 60.34 | lens L43 |
| 22 | −105.99400 | 0.200 | | | |
| 23 | 95.70000 | 10.700 | 1.72342 | 37.99 | lens L44 |
| 24 | −117.86300 | | | | |
| T | 72.0 | 4.618 | 24.156 | 2.554 | 2.9 |

$fw_{12}/fw_{34}=1.1$

Figure 8:
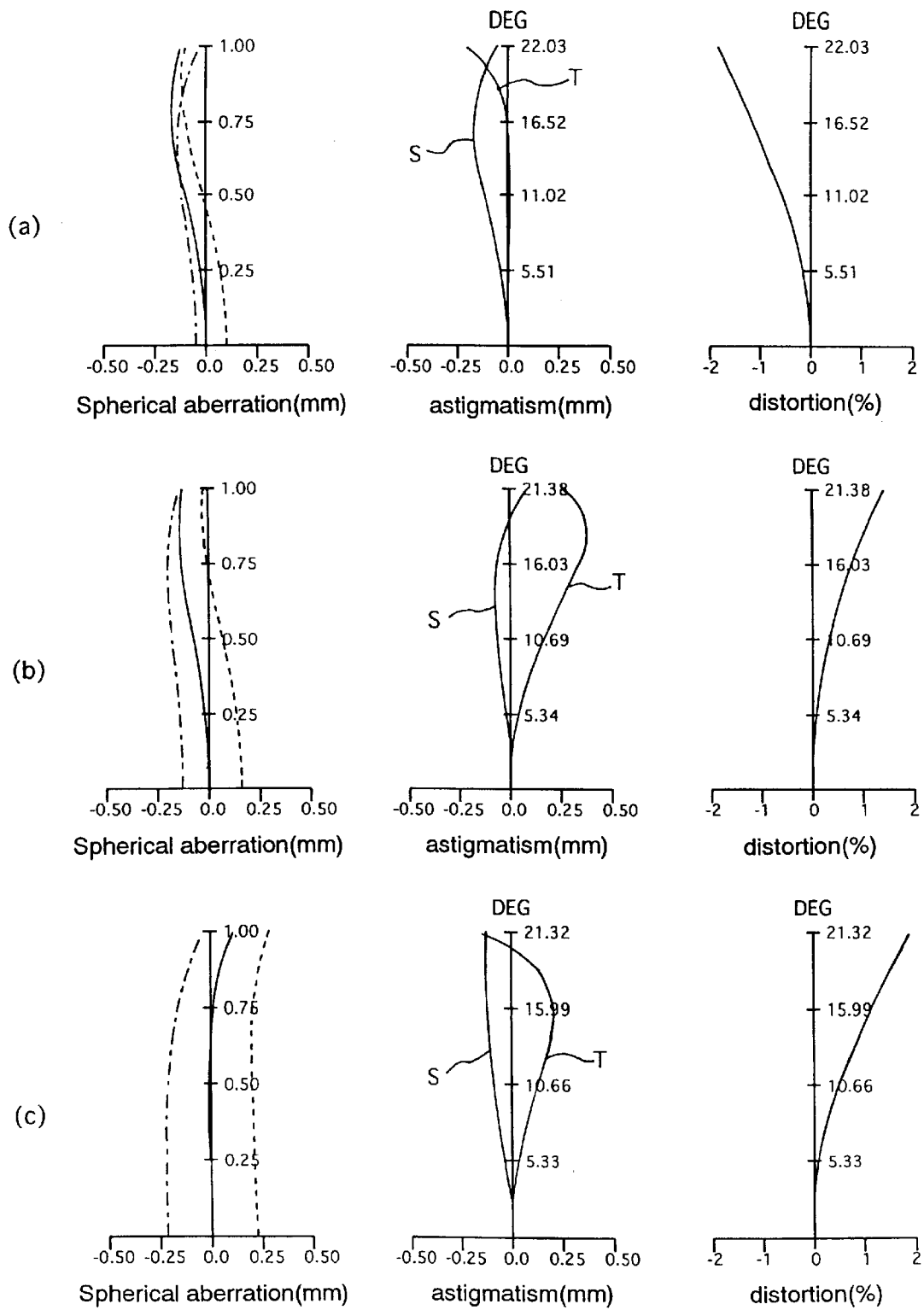
FIG. 8 indicates various aberration curves of the lens system of Embodiment 4 at each condition as same as FIG. 2.

FIG. 8 indicates the spherical aberration, the astigmatism and the distortion at the wide-angle extremity (a), an intermediate zoom point (b) and the telescopic extremity (c) of the projecting zoom lens of this embodiment. The projecting zoom lens of this embodiment is also a bright lens having an f-number of 2.3–2.9 and a short focal length range of 48.1–72.0. Although the ratio $fw_{12}/fw_{34}$ is relatively toward the upper limit, the values of the aberrations at the telescopic extremity and the aberrations in the other regions are sufficiently small, these are indicating good characteristics.

[Embodiment 5]

Figure 9:
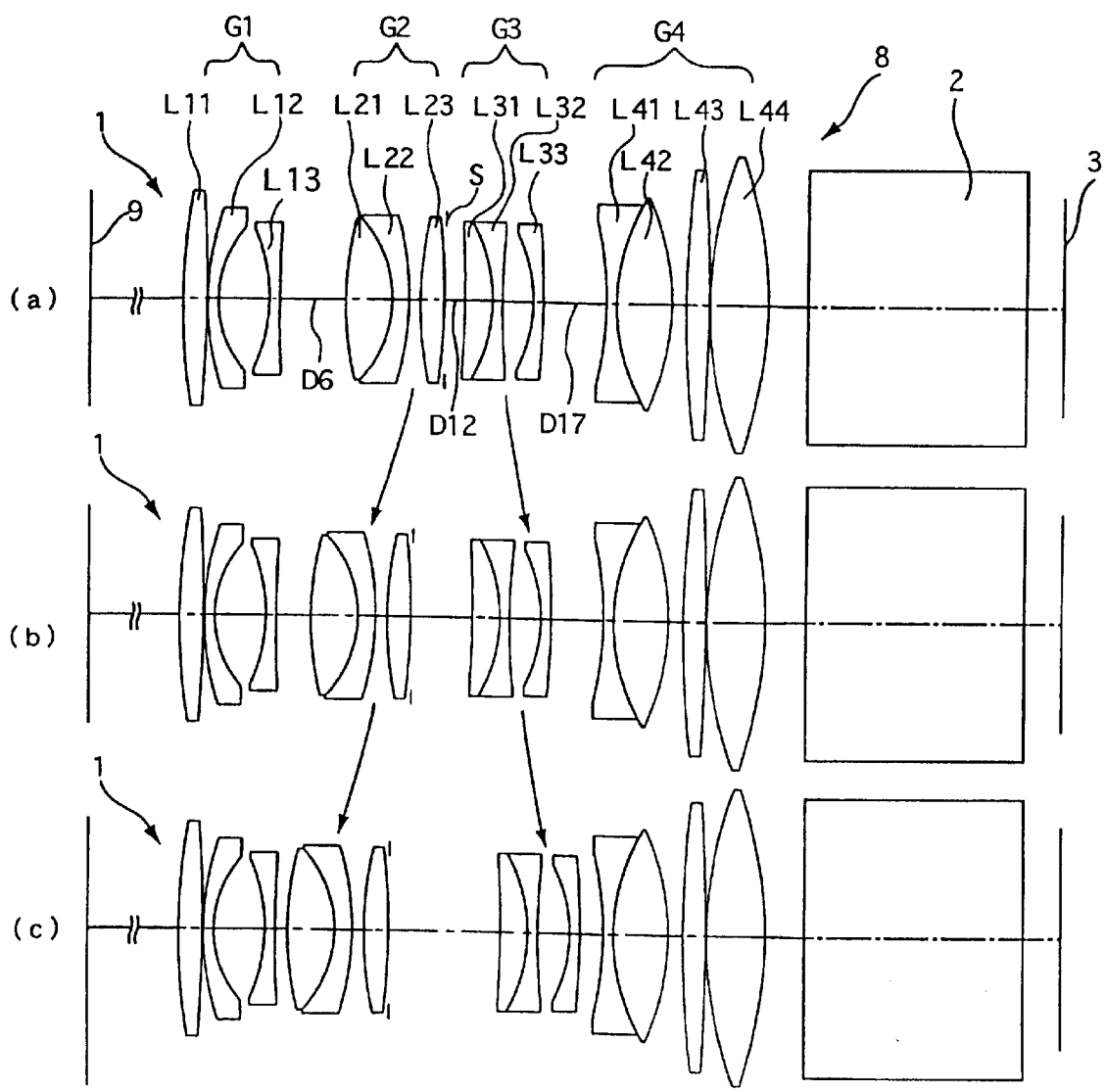
FIG. 9 shows an optical system employing lens system according to Embodiment 5 of the present invention, illustrating lens system arrangements at each condition as same as FIG. 1.

FIG. 9 shows an optical system of a projector employing a projecting zoom lens 1 according to an embodiment 5 of the present invention. The projecting zoom lens system 1 of this embodiment is also made up of first to fourth groups G1–G4 arranged sequentially from the screen side and having negative, positive, negative and positive refractive powers, respectively. Therefore, the projecting zoom lens 1 of this embodiment also achieves substantially the same abilities as the foregoing embodiments. In the projecting zoom lens system 1 of this embodiment, the fourth lens group G4, disposed on the incidence side, employs a lens whose incidence-side surface is aspherical, as the lens L44 on the incidence side. Since the incidence-side arrangement of the projecting zoom lens 1 for a projector apparatus is telecentric, imaging light rays passes through different portions of lenses. Therefore, by using the aspherical lens surface on the incidence side, the projecting zoom lens system 1 of this embodiment accomplishes correction of aberrations separately for a central lens portion through which an on-axis rays pass and a peripheral lens portion through which an off-axis rays pass. Therefore, a projecting zoom lens having better imaging characteristics is provided.

Lens Data

| i | ri | di | ni | vi | note |
|---|---|---|---|---|---|
| 1 | 129.38000 | 4.800 | 1.75520 | 27.53 | lens L11 |
| 2 | −284.40200 | 0.200 | | | |
| 3 | 60.62700 | 2.000 | 1.48749 | 70.44 | lens L12 |
| 4 | 23.01200 | 9.900 | | | |
| 5 | −34.39500 | 2.000 | 1.65844 | 50.85 | lens L13 |
| 6 | 319.00300 | D6 | | | |
| 7 | 68.81800 | 9.300 | 1.71700 | 47.98 | lens L21 |
| 8 | −24.00000 | 3.500 | 1.84666 | 23.78 | lens L22 |
| 9 | −57.97400 | 2.300 | | | |
| 10 | 78.55400 | 4.900 | 1.78590 | 43.93 | lens L23 |
| 11 | −137.43800 | 0.200 | | | |
| 12 | INF | D12 | | | stop S |
| 13 | −215.31900 | 5.600 | 1.84666 | 23.78 | lens L31 |
| 14 | −31.57400 | 2.000 | 1.60342 | 38.01 | lens L32 |
| 15 | 151.39900 | 6.400 | | | |
| 16 | −30.22100 | 2.000 | 1.58144 | 40.89 | lens L33 |
| 17 | −177.27100 | D17 | | | |
| 18 | −71.20500 | 2.000 | 1.84666 | 23.78 | lens L41 |
| 19 | 42.07800 | 10.900 | 1.48749 | 70.44 | lens L42 |
| 20 | −51.06100 | 2.900 | | | |
| 21 | 232.56500 | 4.600 | 1.62041 | 60.34 | lens L43 |
| 22 | −422.88000 | 0.200 | | | |
| 23 | 82.04300 | 12.000 | 1.72342 | 37.99 | lens L44 |
| 24 | −76.18300 | | | | |
| 25 | INF | 44.000 | 1.51680 | 64.20 | prism |
| 26 | INF | | | | |

| Condition | f | D6 | D12 | D17 | F-No. |
|---|---|---|---|---|---|
| W | 48.1 | 13.074 | 4.003 | 12.477 | 2.3 |
| I | 60.0 | 6.869 | 12.354 | 10.332 | 2.6 |
| T | 72.0 | 2.400 | 22.619 | 4.535 | 2.9 |

$fw_{12}/fw_{34}=0.48$

The aspherical factors of the surface 24 (lens L44)

K=0.00000

$A=0.14390\times10^{-5}$, $B=-0.66870\times10^{-9}$ $C=0.54340\times10^{-12}$, $D=-0.23830\times10^{-15}$ The Aspherical Equation is as Follows:

$$x=(y^2/r)/[1+\{1-(1+K)(y^2/r^2)\}^{1/2}]+Ay^4+By^6+Cy^8+Dy^{10} \quad (2)$$

Figure 10:
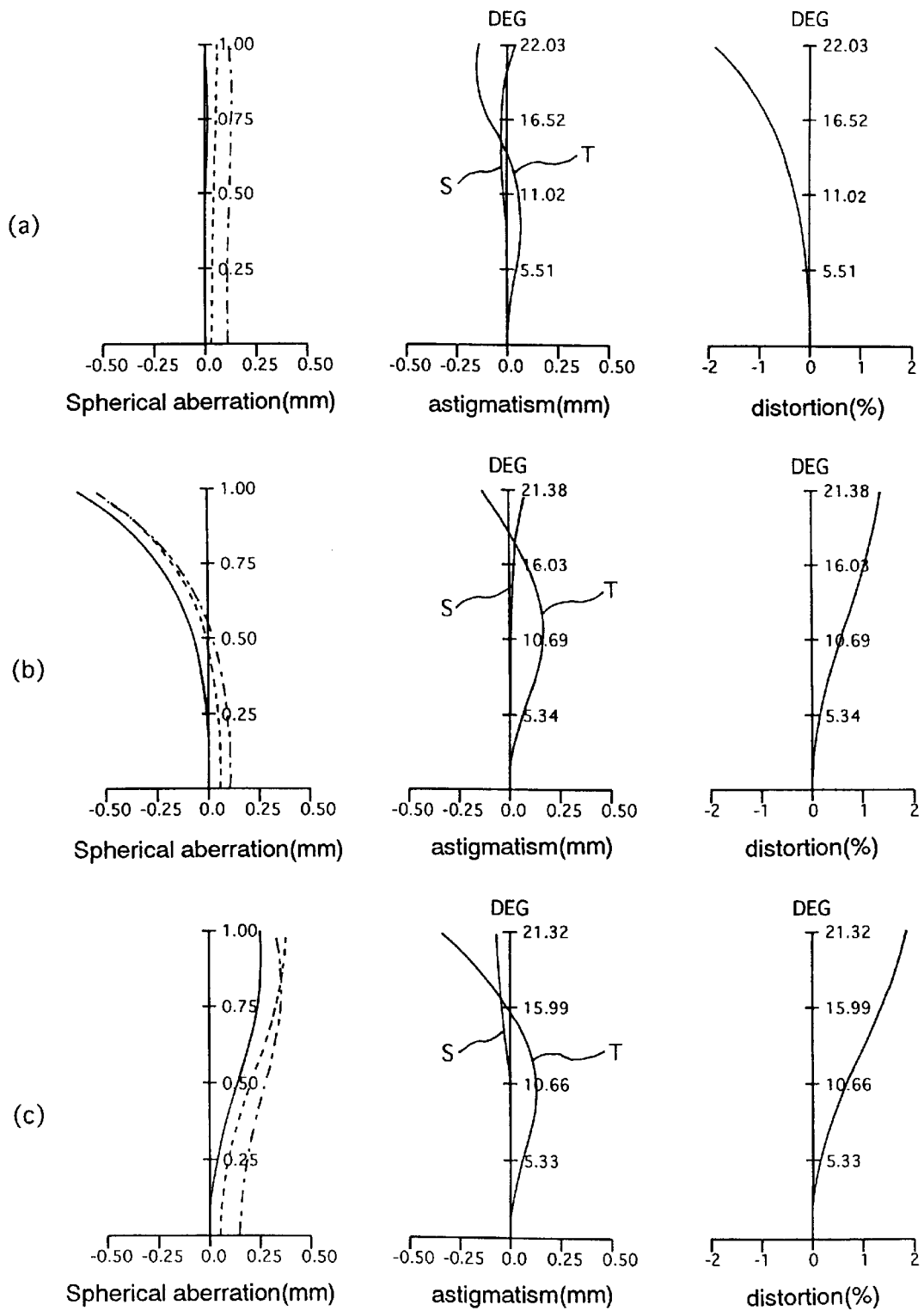
FIG. 10 indicates various aberration curves of the lens system of Embodiment 5 at each condition as same as FIG. 2.

FIG. 10 indicates the spherical aberration, the astigmatism and the distortion at the wide-angle extremity (a), an intermediate zoom point (b) and the telescopic extremity (c) of the projecting zoom lens system of this embodiment. This embodiment also achieves a bright projecting zoom lens having an f-number of 2.3–2.9 and a short focal length range of 48.1–72.0. The ratio of the resultant focal length $fw_{12}$ to the resultant focal length $fw_{34\ is}$ within the predetermined range. The characteristics regarding the aberrations are improved almost constantly over the range between the wide-angle extremity and the telescopic extremity, including the intermediate range. Thus, the projecting zoom lens system of this embodiment has excellent imaging abilities over the entire range.

[Embodiment 6]

Figure 11:
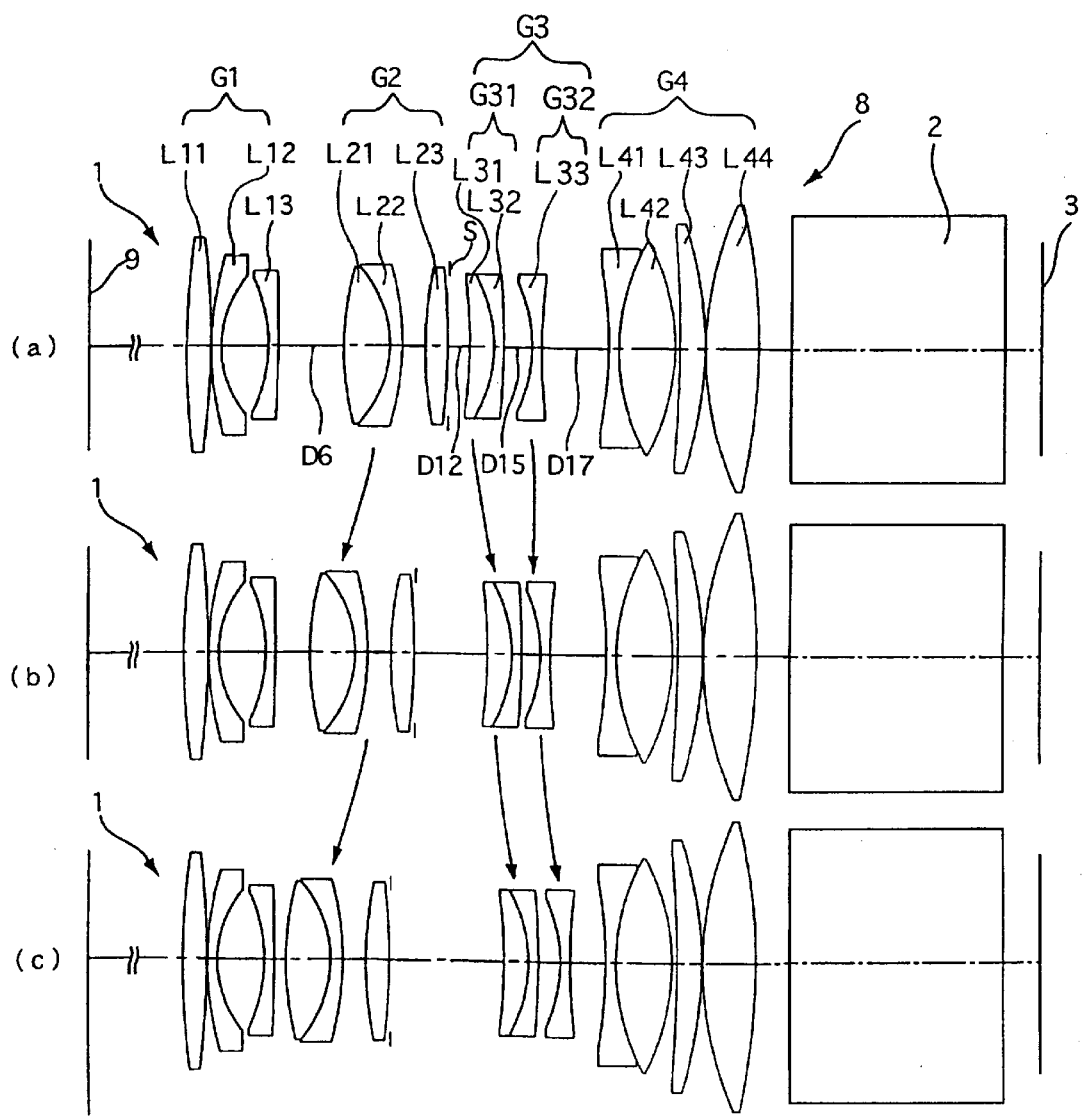
FIG. 11 shows an optical system employing lens system according to Embodiment 6 of the present invention, illustrating lens system arrangements at each condition as same as FIG. 1.

FIG. 11 shows an optical system of a projector employing a projecting zoom lens 1 according to an embodiment 6 of the present invention. The projecting zoom lens system 1 of this embodiment is also made up of first to fourth groups G1–G4 arranged sequentially from the screen 9 side and having negative, positive, negative and positive refractive powers, respectively. Therefore, the projecting zoom lens system 1 of this embodiment also has substantially the same abilities as the foregoing embodiments. In the projecting zoom lens system 1 of this embodiment, the third lens group G3 is divided into a forward group G31 and a rearward group G32 which are movable independently of each other along the optical axis during zoom. Therefore, imaging can be achieved using appropriate portions of each lens group for image display over the zoom range between the wide-angle extremity and the telescopic extremity, including the intermediate range, so that further reductions in the aberrations and curvature of field are possible. In particular, the third lens group G3 in the projecting zoom lens system 1 of this invention is a lens group for correction so that it is easy to control. In addition, the third lens group G3 has a smaller aperture than the other lens groups, so that the group G3 can be moved easily and a high correction effect can be achieved by a short moving distance.

In this embodiment, a screen side-concave positive meniscus lens L31 and a biconcave negative lens L32, forming a doublet, form the forward group G31 having a weak positive refractive power, and a biconcave negative lens L33 forms the rearward group G32 having a negative refractive power. Control is performed such that the distance between the forward group G31 and the rearward group G32 generally decreases and then increase with zooming from the wide-angle extremity toward the telescopic extremity, whereby the abilities of the projecting lens can be further improved.

Lens Data

| i | ri | di | ni | vi | note |
|---|---|---|---|---|---|
| 1 | 166.01000 | 5.000 | 1.75520 | 27.53 | lens L11 |
| 2 | −180.92000 | 0.200 | | | |
| 3 | 68.51500 | 2.000 | 1.48749 | 70.44 | lens L12 |
| 4 | 22.66800 | 9.700 | | | |
| 5 | −32.56100 | 2.000 | 1.65844 | 50.85 | lens L13 |
| 6 | −384.93600 | D6 | | | |
| 7 | 63.59400 | 9.100 | 1.71700 | 47.98 | lens L21 |
| 8 | −24.69400 | 2.500 | 1.84666 | 23.78 | lens L22 |
| 9 | −62.01200 | 4.600 | | | |
| 10 | 85.31000 | 4.600 | 1.78590 | 43.93 | lens L23 |
| 11 | −140.52900 | 0.200 | | | |
| 12 | INF | D12 | | | stop S |
| 13 | −103.36200 | 5.000 | 1.84666 | 23.78 | lens L31 |
| 14 | −29.53000 | 2.000 | 1.60342 | 38.01 | lens L32 |
| 15 | −168.53900 | D15 | | | |
| 16 | −31.39600 | 2.000 | 1.58144 | 40.89 | lens L33 |
| 17 | 122.71500 | D17 | | | |
| 18 | −94.31200 | 2.000 | 1.84666 | 23.78 | lens L41 |
| 19 | 46.06900 | 11.300 | 1.48749 | 70.44 | lens L42 |
| 20 | −47.44900 | 1.000 | | | |
| 21 | −282.02500 | 5.200 | 1.62041 | 60.34 | lens L43 |
| 22 | −81.64600 | 0.200 | | | |

-continued

| 23 | 72.56800 | 10.800 | 1.72342 | 37.99 | lens L44 |
|---|---|---|---|---|---|
| 24 | −130.03400 | | | | |
| 25 | INF | 44.000 | 1.51680 | 64.20 | prism |
| 26 | INF | | | | |

| Condition | f | D6 | D12 | D15 | D17 | F-No. |
|---|---|---|---|---|---|---|
| W | 48.1 | 13.422 | 4.412 | 5.836 | 13.681 | 2.3 |
| I | 60.0 | 7.111 | 14.912 | 3.843 | 11.503 | 2.6 |
| T | 72.0 | 2.398 | 23.191 | 4.470 | 7.311 | 2.9 |

$fw_{12}/fw_{34}=0.5$

Figure 12:
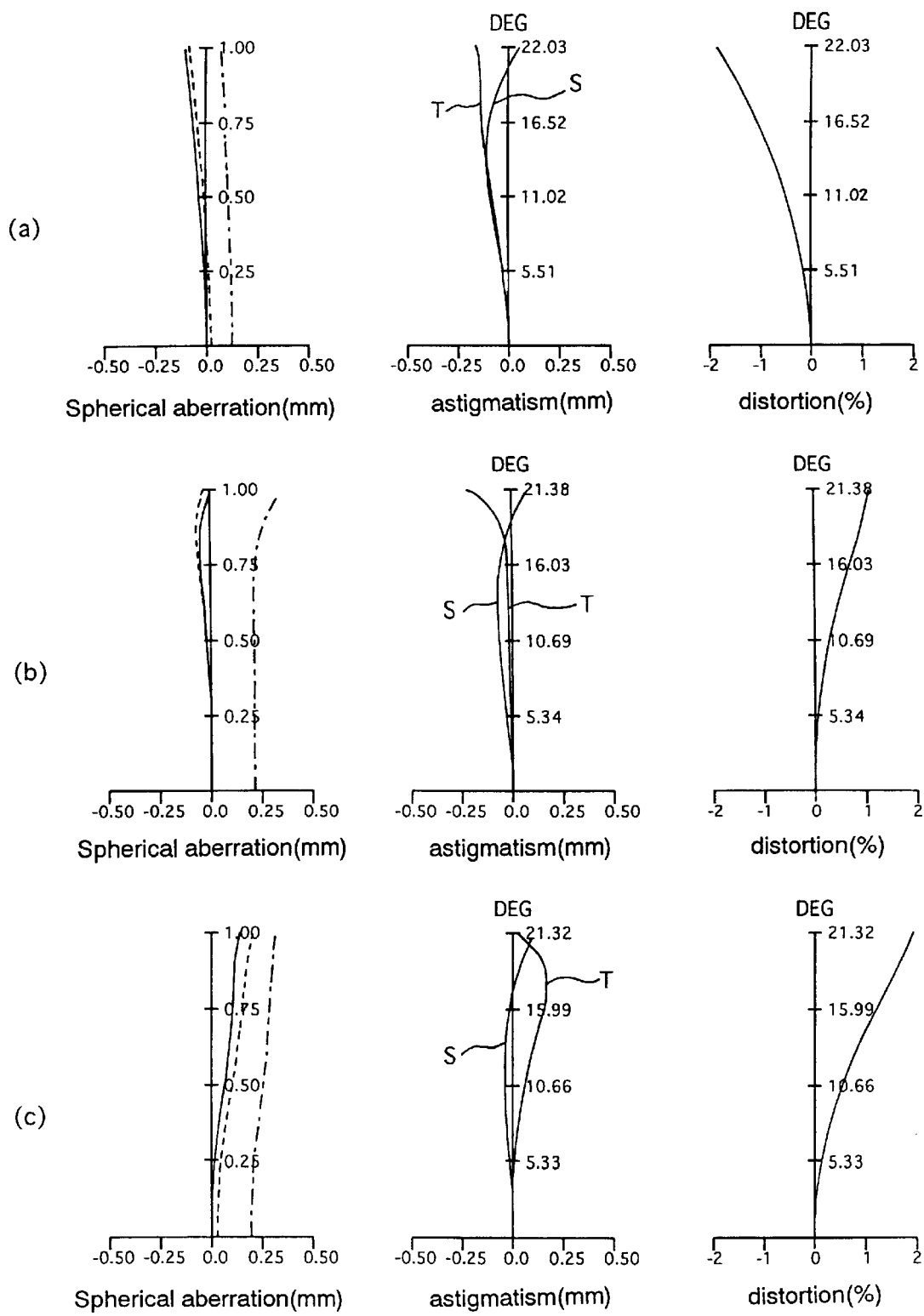
FIG. 12 indicates various aberration curves of the lens system of Embodiment 6 at each condition as same as FIG. 2.

FIG. 12 indicates the spherical aberration, the astigmatism and the distortion at the wide-angle extremity (a), an intermediate zoom point (b) and the telescopic extremity (c) of the projecting zoom lens of this embodiment. This embodiment also realizes a bright projecting zoom lens having an f-number of 2.3–2.9 and a short focal length range of 48.1–72.0. The ratio of the resultant focal length $fw_{12}$ to the resultant focal length $fw_{34}$ is within the predetermined range. As indicated in FIG. 12, superior characteristics regarding the aberrations are achieved at the wide-angle extremity, the intermediate point and the telescopic extremity.

[Embodiment 7]

Figure 13:
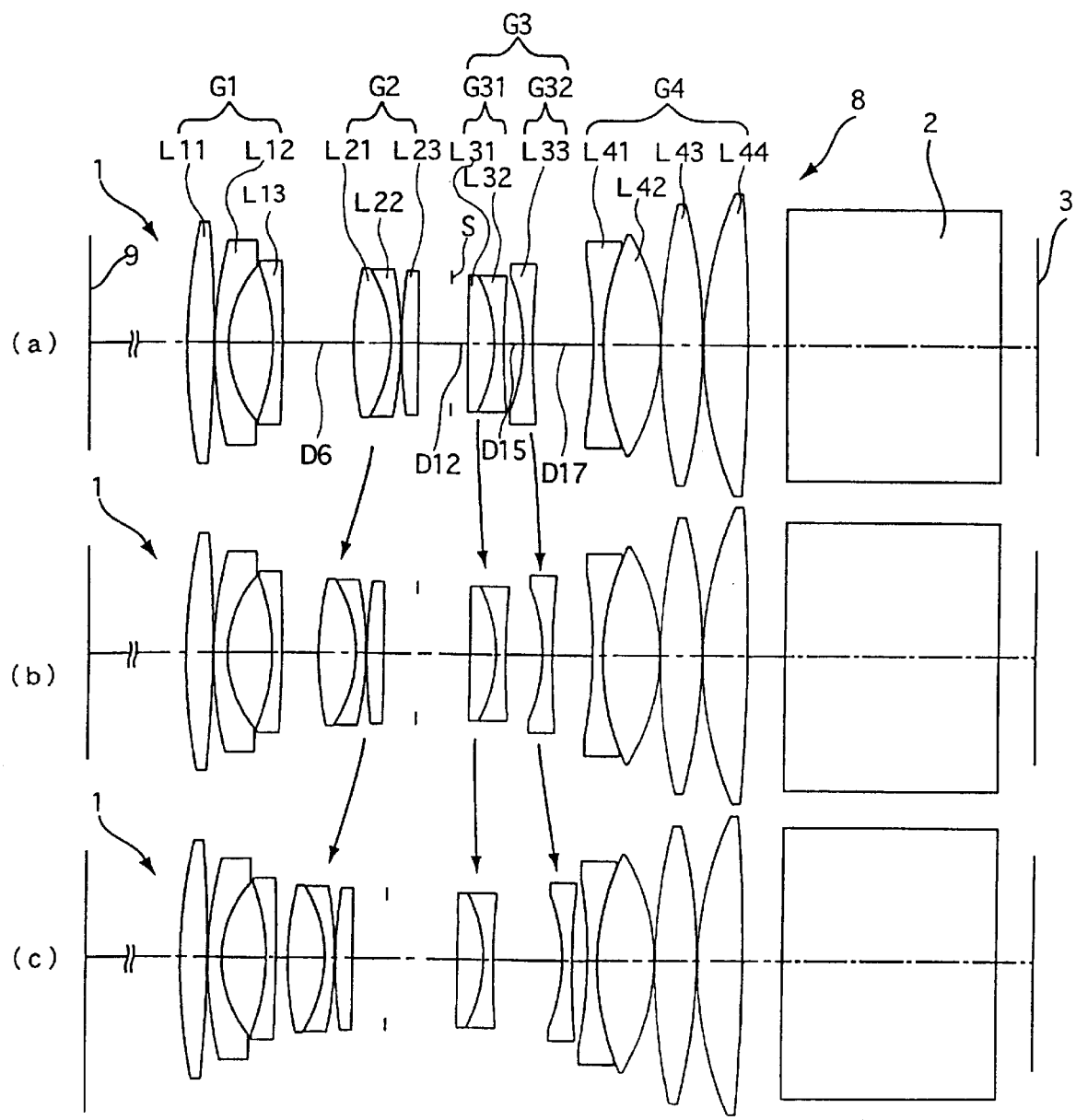
FIG. 13 shows an optical system employing lens system according to Embodiment 7 of the present invention, illustrating lens system arrangements at each condition as same as FIG. 1.

FIG. 13 shows an optical system of a projector employing a projecting zoom lens system 1 according to an embodiment 7 of the present invention. The projecting zoom lens system 1 of this embodiment is also made up of first to fourth groups G1–G4 arranged sequentially from the screen 9 side and having negative, positive, negative and positive refractive powers, respectively. Furthermore, the third lens group G3 is divided into a forward group G31 and a rearward group G32 that can be controlled separately from each other. While, in the previously-described embodiment, the forward group G31, in the third lens group G3, is mainly moved for correction in accordance with zooming, this embodiments mainly moves the rearward group G32 for correction. In this embodiment, since the forward group G31 having a positive refractive power and the rearward group G32 having a negative refractive power, the distance between the forward group G31 and the rearward group G32 generally increase with zooming from the wide-angle extremity toward the telescopic extremity. Data regarding each lens are indicated below.

Lens Data

| i | ri | di | ni | vi | note |
|---|---|---|---|---|---|
| 1 | 121.72600 | 5.600 | 1.75520 | 27.53 | lens L11 |
| 2 | −260.43200 | 0.200 | | | |
| 3 | 84.57800 | 2.800 | 1.48749 | 70.44 | lens L12 |
| 4 | 24.74400 | 9.000 | | | |
| 5 | −42.88600 | 2.000 | 1.65844 | 50.85 | lens L13 |
| 6 | −378.53000 | D6 | | | |
| 7 | 68.04000 | 7.500 | 1.71700 | 47.98 | lens L21 |
| 8 | −28.58100 | 2.000 | 1.84666 | 23.78 | lens L22 |
| 9 | −74.34200 | 0.200 | | | |
| 10 | 111.67900 | 3.400 | 1.78590 | 43.93 | lens L23 |
| 11 | −1320.45500 | 6.800 | | | |
| 12 | INF | D12 | | | stop S |
| 13 | −1171.43300 | 5.300 | 1.84666 | 23.78 | lens L31 |
| 14 | −30.24800 | 2.000 | 1.60342 | 38.01 | lens L32 |
| 15 | 169.16800 | D15 | | | |
| 16 | −35.84000 | 2.000 | 1.58144 | 40.89 | lens L33 |
| 17 | 171.55200 | D17 | | | |
| 18 | −95.33300 | 2.000 | 1.84666 | 23.78 | lens L41 |
| 19 | 54.91900 | 11.500 | 1.48749 | 70.44 | lens L42 |
| 20 | −43.37700 | 0.200 | | | |
| 21 | 124.68700 | 8.600 | 1.62041 | 60.34 | lens L43 |
| 22 | −111.31000 | 0.200 | | | |
| 23 | 75.91400 | 9.300 | 1.72342 | 37.99 | lens L44 |
| 24 | −380.59100 | | | | |
| 25 | INF | 44.000 | 1.51680 | 64.20 | prism |
| 26 | INF | | | | |

| Condition | f | D6 | D12 | D15 | D17 | F-No. |
|---|---|---|---|---|---|---|
| W | 48.1 | 14.386 | 3.568 | 4.025 | 12.562 | 2.3 |
| I | 60.0 | 7.514 | 10.944 | 7.698 | 8.385 | 2.6 |
| T | 72.0 | 2.400 | 14.633 | 14.350 | 3.158 | 2.9 |

$fw_{12}/fW_{34}=1.1$

Figure 14:
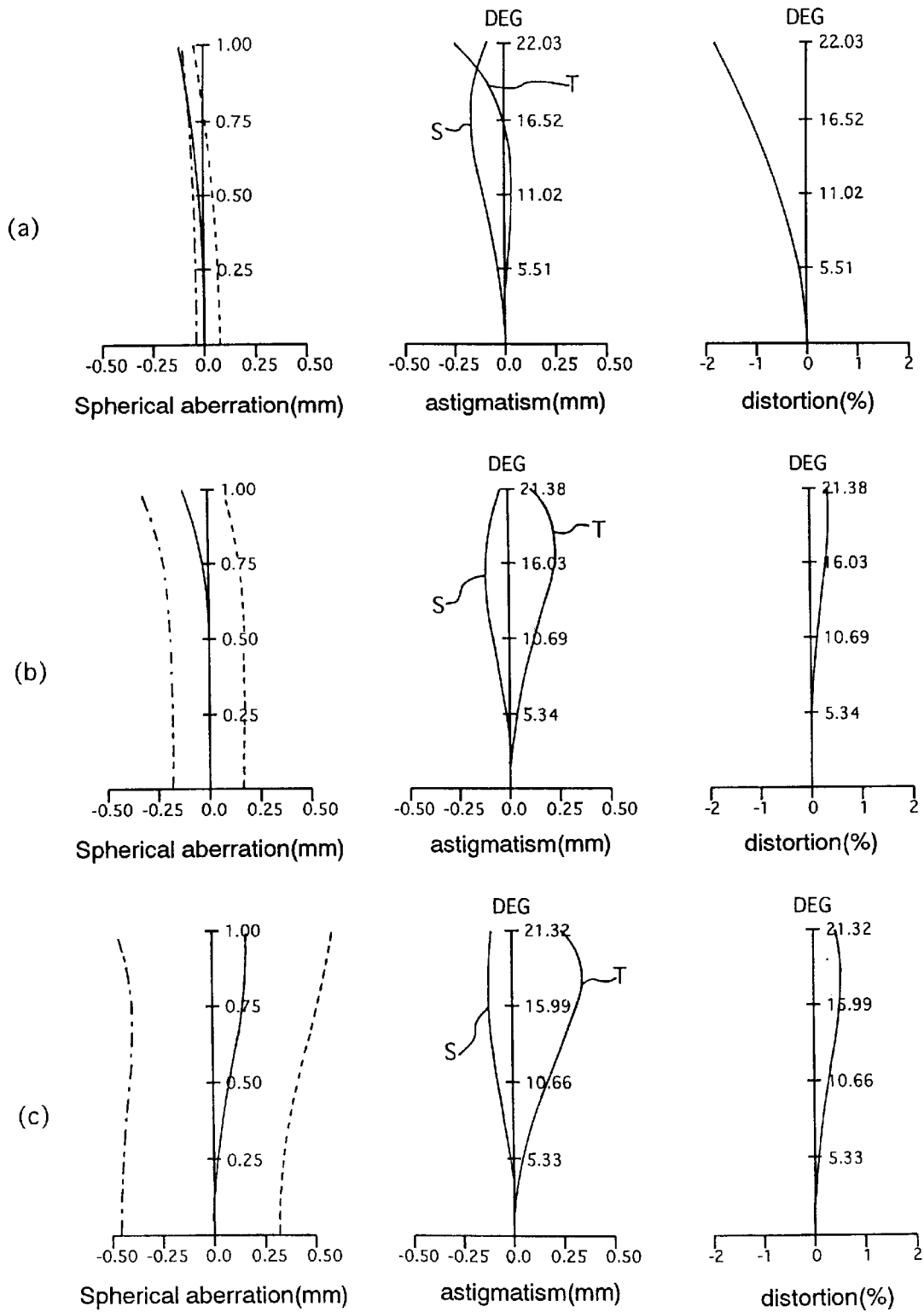
FIG. 14 indicates various aberration curves of the lens system of Embodiment 7 at each condition as same as FIG. 2.

FIG. 14 indicates the spherical aberration, the astigmatism and the distortion at the wide-angle extremity (a), an intermediate zoom point (b) and the telescopic extremity (c) of the projecting zoom lens system of this embodiment. This embodiment also realizes a bright projecting zoom lens having an f-number of 2.3–2.9 and a short focal length range of 48.1–72.0. Although the ratio of the resultant focal length $fw_{12}$ to the resultant focal length $fw_{34}$ is relatively toward the upper limit, the aberrations at the telescopic extremity have values that will not cause any practical problems. The values of the astigmatism and the distortion aberration are sufficiently reduced over the range between the wide-angle extremity and the telescopic extremity, including the intermediate range.

[Embodiment 8]

Figure 15:
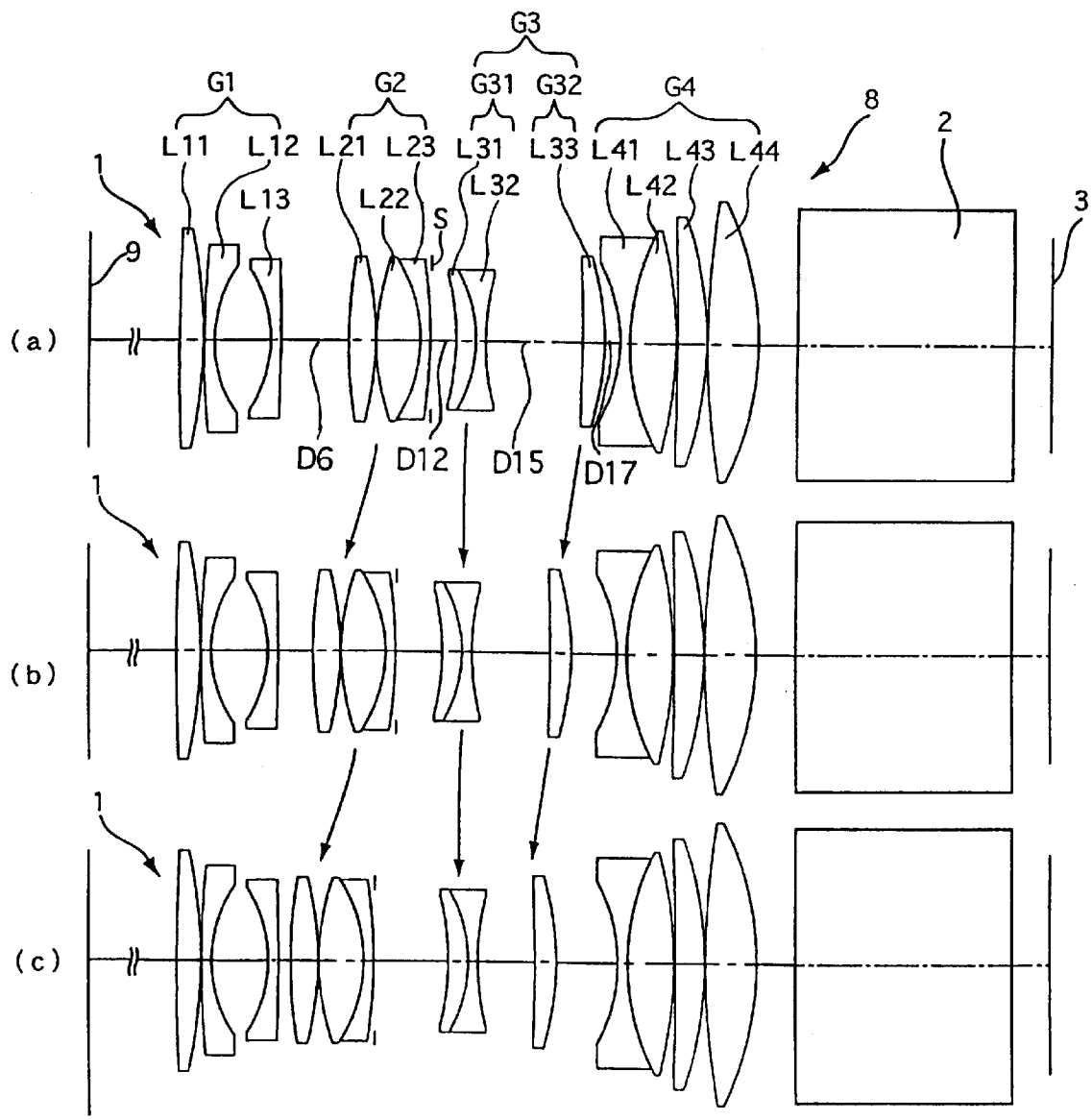
FIG. 15 shows an optical system employing lens system according to Embodiment 8 of the present invention, illustrating lens system arrangements at each condition as same as FIG. 1.

FIG. 15 shows an optical system of a projector employing a projecting zoom lens system 1 according to an embodiment 8 of the present invention. As in the foregoing embodiments, the projecting zoom lens system 1 of this embodiment is also made up of first to fourth groups G1–G4 arranged sequentially from the screen 9 side and having negative, positive, negative and positive refractive powers, respectively. The third lens group G3 is divided into a forward group G31 and a rearward group G32 that can be controlled separately from each other. Furthermore, the forward group G31 of the third lens group G3 has a negative refractive power that is provided by a doublet of a lens L31 and a lens L32. The rearward group G32 of the third lens group G3 is formed by an incidence side-convex positive lens L33. Therefore, unlike the embodiments previously described, since the forward group G31 has a negative refractive power and the rearward group G32 has a positive refractive power, the distance between the forward group G31 and the rearward group G32 are controlled to reduce with zooming from the wide-angle extremity to the telescopic extremity.

The positive lens L33 of the third lens group G3 in this embodiment is a lens whose incidence-side surface is aspherical, so that correction of aberrations can be accomplished separately for a central lens portion and a peripheral lens portion as in the embodiment 5. In particular, the third lens group has a smaller aperture than the other lens groups, so that the aspherical lens may be correspondingly small, thereby reducing costs of the lens system. Furthermore, in the projecting zoom lens 1 of this embodiment, the third lens group G3 is divided into the two groups, which are designed to accomplish proper correction of aberrations over the entire zoom range between the wide-angle extremity and the telescopic extremity. Therefore, it is possible to provide a projecting zoom lens good in imaging (display) characteristics and low in cost.

Lens Data

| i | ri | di | ni | vi | note |
|---|---|---|---|---|---|
| 1 | 636.04490 | 4.900 | 1.74077 | 27.76 | lens L11 |
| 2 | −100.69300 | 0.200 | | | |
| 3 | 231.90100 | 2.000 | 1.48749 | 70.44 | lens L12 |
| 4 | 27.02500 | 11.100 | | | |
| 5 | −27.33300 | 2.000 | 1.48749 | 70.44 | lens L13 |
| 6 | −402.13400 | D6 | | | |
| 7 | 108.62800 | 5.400 | 1.72916 | 54.67 | lens L21 |
| 8 | −66.36600 | 0.200 | | | lens L22 |
| 9 | 52.33200 | 8.900 | 1.72916 | 54.67 | |
| 10 | −29.90000 | 2.000 | 1.80518 | 25.46 | lens L23 |
| 11 | −105.00200 | 0.200 | | | |
| 12 | INF | D12 | | | stop S |
| 13 | −50.68500 | 4.100 | 1.84666 | 23.78 | lens L31 |
| 14 | −27.85500 | 2.000 | 1.56883 | 56.04 | lens L32 |
| 15 | 51.76900 | D15 | | | |
| 16 | −362.73800 | 4.500 | 1.60311 | 60.69 | lens L33 |
| 17 | −50.63600 | D17 | | | |
| 18 | −33.48557 | 2.000 | 1.84666 | 23.78 | lens L41 |
| 19 | 49.88100 | 9.100 | 1.62041 | 60.34 | lens L42 |
| 20 | −88.84100 | 0.400 | | | |
| 21 | −616.01700 | 5.900 | 1.62041 | 60.34 | lens L43 |
| 22 | −76.27500 | 0.200 | | | |
| 23 | 174.82500 | 10.500 | 1.80518 | 25.46 | lens L44 |
| 24 | −63.17200 | | | | |
| 25 | INF | 44.000 | 1.51680 | 64.20 | prism |
| 26 | INF | | | | |

| Condition | F | D6 | D12 | D15 | D17 | F-No. |
|---|---|---|---|---|---|---|
| W | 48.1 | 13.385 | 5.196 | 19.985 | 3.105 | 2.3 |
| I | 60.0 | 6.889 | 9.425 | 16.111 | 9.247 | 2.6 |
| T | 72.0 | 2.400 | 15.039 | 11.693 | 12.539 | 2.9 |

$fw_{12}/fw_{34}=0.48$

The aspherical factors of the surface 17 (lens L33):
K=0.00000
A=0.35710×10$^{-5}$, B=0.31790×10$^{-8}$
C=0.61930×10$^{-11}$, D=−0.64920×10$^{-14}$
where the aspherical equation is equation (2) above.

Figure 16:
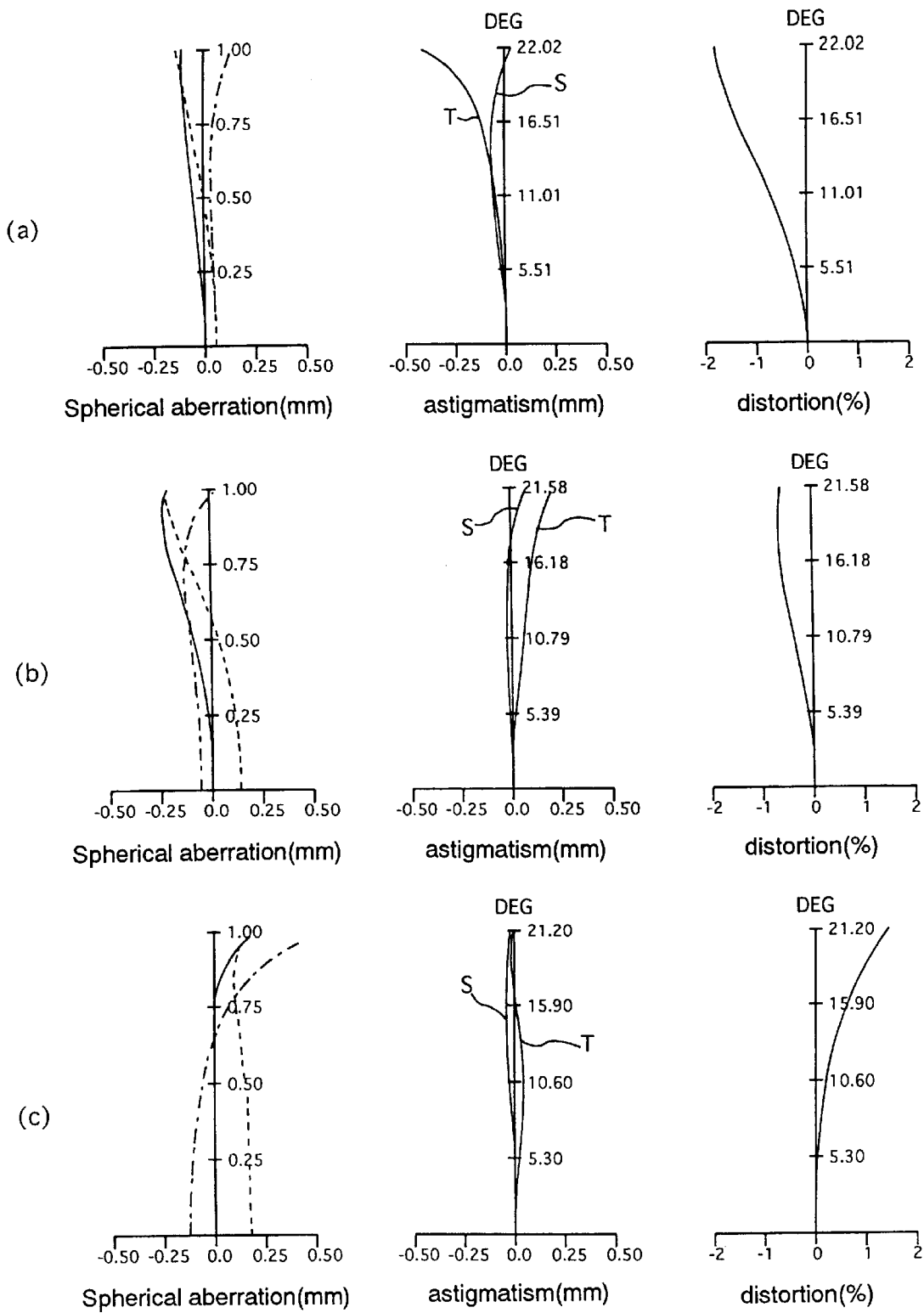
FIG. 16 indicates various aberration curves of the lens system of Embodiment 8 at each condition as same as FIG. 2.

FIG. 16 indicates the spherical aberration, the astigmatism and the distortion at the wide-angle extremity (a), an intermediate zoom point (b) and the telescopic extremity (c) of the projecting zoom lens system 1 of this embodiment. This embodiment also realizes a bright lens having an f-number of 2.3–2.9 and a short focal length range of 48.1–72.0. Although the ratio of the resultant focal length $fw_{12}$ to the resultant focal length $fw_{34}$ is relatively toward the lower limit, the chromatic aberration is sufficiently small. The values of the other various aberrations are small over the entire zoom range. The projecting zoom lens of this embodiment achieves superior characteristics over the entire zoom range.

[Embodiment 9]

Figure 17:
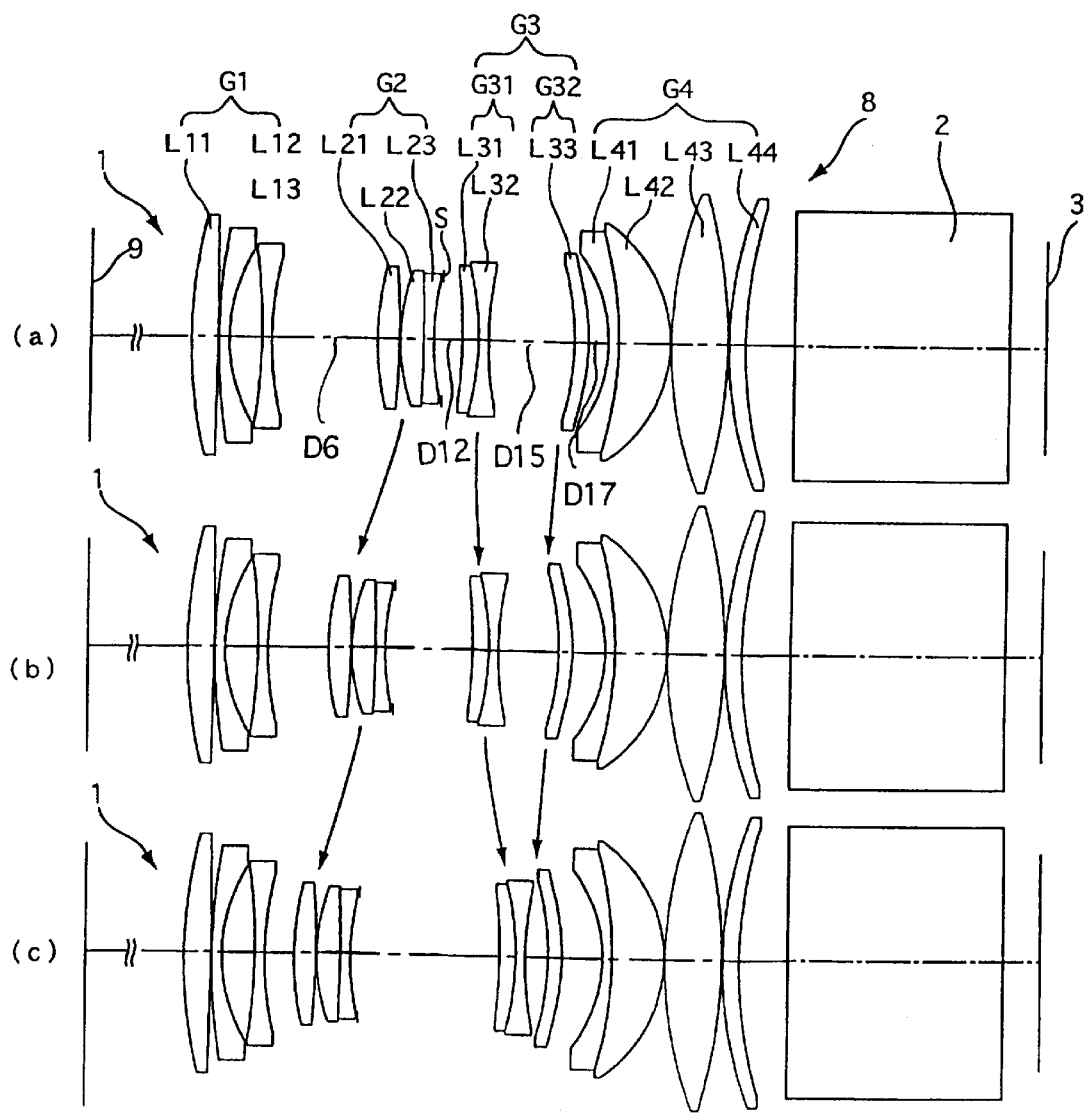
FIG. 17 shows an optical system employing lens system according to Embodiment 9 of the present invention, illustrating lens system arrangements at each condition as same as FIG. 1.

FIG. 17 shows an optical system of a projector employing a projecting zoom lens 1 according to an embodiment 9 of the present invention. The projecting zoom lens 1 of this embodiment has a similar construction to that of the embodiment 8. In the projecting zoom lens 1 of this embodiment, the positive lens L33 of the rear groups G32 of the third lens group is an incidence side-convex meniscus lens, whereby the spherical aberration correcting ability is further improved. The lens L44 on the incidence side in the fourth lens group G4 is an incidence side-concave negative meniscus lens, whereby further correction of spherical aberration is made possible.

Lens Data

| i | ri | di | ni | vi | note |
|---|---|---|---|---|---|
| 1 | 97.97400 | 5.400 | 1.74077 | 27.76 | lens L11 |
| 2 | −1205.36300 | 0.200 | | | |
| 3 | 132.74000 | 2.000 | 1.48749 | 70.44 | lens L12 |
| 4 | 35.02700 | 6.600 | | | |
| 5 | −122.52900 | 2.000 | 1.48749 | 70.44 | lens L13 |
| 6 | 67.70000 | D6 | | | |
| 7 | 60.46900 | 4.500 | 1.72916 | 54.67 | lens L21 |
| 8 | −178.26700 | 0.200 | | | lens L22 |
| 9 | 42.23500 | 4.700 | 1.72916 | 54.67 | |
| 10 | −297.90000 | 2.000 | 1.80518 | 25.46 | lens L23 |
| 11 | 56.84300 | 1.700 | | | |
| 12 | INF | D12 | | | stop S |
| 13 | −113.02400 | 3.400 | 1.84666 | 23.78 | lens L31 |
| 14 | −57.35200 | 2.000 | 1.56883 | 56.04 | lens L32 |
| 15 | 70.62100 | D15 | | | |
| 16 | −56.84400 | 2.900 | 1.60311 | 60.69 | lens L33 |
| 17 | −45.69000 | D17 | | | |
| 18 | −30.07900 | 2.000 | 1.84666 | 23.78 | lens L41 |
| 19 | −80.27600 | 10.600 | 1.62041 | 60.34 | lens L42 |
| 20 | −29.13900 | 0.200 | | | |
| 21 | 82.37100 | 11.700 | 1.62041 | 60.34 | lens L43 |
| 22 | −105.42200 | 0.200 | | | |
| 23 | 84.14700 | 3.300 | 1.80518 | 25.46 | lens L44 |
| 24 | 96.57000 | | | | |
| 25 | INF | 44.000 | 1.51680 | 64.20 | prism |
| 26 | INF | | | | |

| Condition | f | D6 | D12 | D15 | D17 | F-No. |
|---|---|---|---|---|---|---|
| w | 48.1 | 21.544 | 4.129 | 18.135 | 4.089 | 2.3 |
| I | 60.0 | 12.500 | 16.081 | 12.636 | 6.681 | 2.6 |
| T | 72.0 | 6.061 | 28.769 | 4.788 | 8.280 | 2.9 |

$fw_{12}/fw_{34}=1.4$

The aspherical factors of the surface 17 (lens L33):
K 0.00000
A=0.57980×10$^{-5}$, B=0.38690×10$^{-8}$
C=0.79600×10$^{-11}$, D=−0.72410×10$^{31\ 14}$
where the aspherical equation is equation (2) above.

Figure 18:
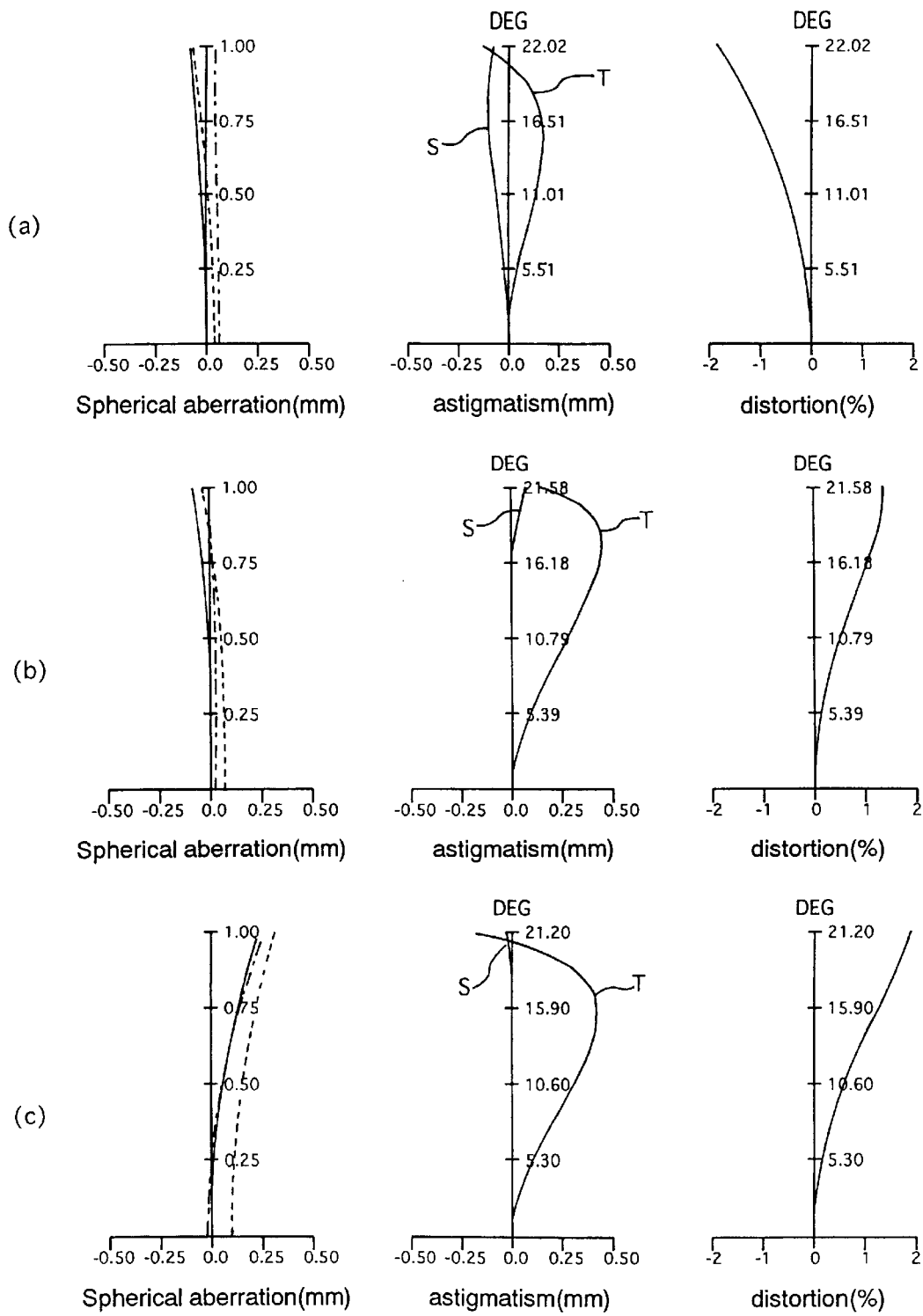
FIG. 18 indicates various aberration curves of the lens system of Embodiment 9 at each condition as same as FIG. 2.

FIG. 18 indicates the spherical aberration, the astigmatism and the distortion aberration at the wide-angle extremity (a), an intermediate zoom point (b) and the telescopic extremity (c) of the projecting zoom lens system 1 of this embodiment. As indicated, the zoom lens of this embodiment has very small spherical aberrations. The characteristics regarding the other aberrations are also sufficiently good. This embodiment also realizes a bright projecting zoom lens having an f-number of 2.3–2.9 and a short focal length range of 48.1–72.. Although the ratio of the resultant focal length $fw_{12}$ to the resultant focal length $fw_{34}$ is rather close to the upper limit, the values of the aberrations at the telescopic extremity are sufficiently small. The values of the aberrations in the other zoom range are good.

As described above, the projecting zoom lens system of the present invention is a projecting zoom lens whose incidence side is telecentric and which is formed by the first to fourth lens groups arranged sequentially from the screen side and having negative, positive, negative and positive refractive powers, respectively. Since the lens group used on the screen side has a negative refractive power, a wider angle and a smaller lens aperture (diameter of the first lens group) can be achieved, so that it is possible to provide a compact projecting zoom lens system having a larger aperture as a whole. Furthermore, in the projecting zoom lens of the present invention, employment of a positive lens on the screen side in the first lens group improves the balance of refractive power. Division of the third lens group into two groups, that is, the forward and rearward groups, can increase the corrective range. Further, provision of an incidence-side aspherical surface makes it possible to accomplish appropriate correction of aberrations of telecentric incident light separately for a central lens portion and a peripheral lens portion. Therefore, according to the present invention, it is possible to provide a projecting zoom lens system that accomplishes good correction of aberrations at the wide-angle extremity and the telescopic extremity and over the intermediate zoom range. Hence a projecting zoom lens system having high in resolution and low in distortion and chromatic aberration reducing color drift. Using this projecting zoom lens, it is possible to provide a compact projector apparatus capable of producing a bright and large-size image at a short projecting distance.

What is claimed is:

1. A projecting zoom lens system having a telecentric incidence side comprising a first lens group having a negative refractive power, a second lens group having a positive refractive power, a third lens group having a negative refractive power and a fourth lens group having a positive refractive power, arranged in this order from a screen side, whereby zooming is carried out by fixing said first and fourth lens groups and moving said second and third lens groups, wherein said third lens group comprises a forward group disposed toward the screen side and a rearward group disposed toward the incidence side, and a distance between said forward and rearward groups is controlled during zooming.

2. A projecting zoom lens system according to claim 1, wherein said first lens group comprises at least two lens components including a positive refractive power lens component and a negative refractive power lens component that are arranged in this order from the screen side.

3. A projecting zoom lens system according to claim 1, wherein one of said forward group and rearward group has a negative refractive power, and the other one of said forward group and rearward group has a positive refractive power.

4. A projecting zoom lens system having a telecentric incidence side comprising a first lens group having a negative refractive power, a second lens group having a positive refractive power, a third lens group having a negative refractive power and a fourth lens group having a positive refractive power, arranged in this order from a screen side, whereby zooming is carried out by fixing said first and fourth lens groups and moving said second and third lens groups, wherein said third lens group or fourth lens group comprises at least one lens component whose incidence side surface is an aspherical convex surface.

5. A projecting zoom lens system according to claim 4, wherein said first lens group comprises at least two lens components including a positive refractive power lens component and a negative refractive power lens component that are arranged in this order from the screen side.

6. A projector apparatus comprising a projecting zoom lens system according to claim 4, and an image forming device capable of supplying an image to be projected at the incidence side of said projecting zoom lens system.

7. A projecting zoom lens system having a telecentric incidence side comprising a first lens group having a negative refractive power, a second lens group having a positive refractive power, a third lens group having a negative refractive power and a fourth lens group having a positive refractive power, arranged in this order from a screen side, whereby zooming is carried out by fixing said first and fourth lens groups and moving said second and third lens groups, wherein a resultant focal length of said first and second lens groups at a wide-angle extremity $fw_{12}$ and a resultant focal length of said third and fourth lens groups at the wide-angle extremity $fw_{34}$ satisfy the following condition:

$$0.3 < (fw_{12}/fW_{34}) < 1.5.$$

8. A projecting zoom lens system according to claim 7, wherein said first lens group comprises at least two lens components including a positive refractive power lens component and a negative refractive power lens component that are arranged in this order from the screen side.

9. A projector apparatus comprising projecting zoom lens system according to claim 7, and an image forming device capable of supplying an image to be projected at the incidence side of said projecting zoom lens system.

10. A projector apparatus comprising a projecting zoom lens system according to claim 1, and an image forming device capable of supplying an image to be projected at the incidence side of said projecting zoom lens system.

* * * * *